United States Patent
Nakarmi et al.

(10) Patent No.: US 12,507,190 B2
(45) Date of Patent: Dec. 23, 2025

(54) HANDLING REGISTRATIONS OF A USER EQUIPMENT IN DIFFERENT COMMUNICATION NETWORKS

(71) Applicant: Telefonaktiebolaget LM Ericsson (publ), Stockholm (SE)

(72) Inventors: Prajwol Kumar Nakarmi, Sollentuna (SE); Monica Wifvesson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 358 days.

(21) Appl. No.: 18/028,167

(22) PCT Filed: Sep. 23, 2021

(86) PCT No.: PCT/IB2021/058695
§ 371 (c)(1),
(2) Date: Mar. 23, 2023

(87) PCT Pub. No.: WO2022/064424
PCT Pub. Date: Mar. 31, 2022

(65) Prior Publication Data
US 2023/0328677 A1 Oct. 12, 2023

Related U.S. Application Data

(60) Provisional application No. 63/081,972, filed on Sep. 23, 2020.

(51) Int. Cl.
*H04W 88/06* (2009.01)
*H04W 8/18* (2009.01)
(Continued)

(52) U.S. Cl.
CPC ......... *H04W 60/005* (2013.01); *H04W 8/183* (2013.01); *H04W 12/37* (2021.01); *H04W 12/40* (2021.01); *H04W 84/042* (2013.01)

(58) Field of Classification Search
CPC .... H04W 60/005; H04W 12/72; H04W 88/06
See application file for complete search history.

(56) References Cited

U.S. PATENT DOCUMENTS

2011/0243119 A1* 10/2011 Chin ............... H04W 48/16
455/67.11
2021/0409934 A1* 12/2021 Tiwari ............... H04W 8/24
(Continued)

FOREIGN PATENT DOCUMENTS

WO 2022064424 A1 3/2022

OTHER PUBLICATIONS

3GPP TS 24.501 V16.6.0, "3rd Generation Partnership Project; Technical Specification Group Core Network and Terminals; Non-Access-Stratum (NAS) protocol for 5G System (5GS); Stage 3; (Release 16)", 3GPP TS 24.501 V16.6.0, Sep. 2020, Sections 4.4.2 and 4.4.3.

(Continued)

*Primary Examiner* — Barry W Taylor
(74) *Attorney, Agent, or Firm* — Sage Patent Group

(57) ABSTRACT

A user equipment ("UE") can handle registrations of the UE in different wireless communication networks. The UE can obtain information indicating whether a Universal Subscriber Identity Module ("USIM") of the UE supports storing multiple different Non-Access Stratum ("NAS") security contexts of the UE associated with the different wireless communication networks. The UE can further determine whether the USIM supports storing the multiple different NAS security contexts of the UE associated with the different wireless communication networks based on the obtained information.

30 Claims, 13 Drawing Sheets

---

Obtain information indicating whether a USIM of a user equipment supports storing multiple different NAS security contexts of the user equipment associated with different wireless communication networks                    700

↓

Determine whether the USIM supports storing the multiple different NAS security contexts of the user equipment associated with different wireless communication networks based on the information                    702

(51) Int. Cl.
*H04W 12/37* (2021.01)
*H04W 12/40* (2021.01)
*H04W 60/00* (2009.01)
*H04W 84/04* (2009.01)

(56) References Cited

U.S. PATENT DOCUMENTS

| | | | |
|---|---|---|---|
| 2022/0053416 A1* | 2/2022 | Salkintzis | H04W 76/10 |
| 2022/0303936 A1* | 9/2022 | Guo | H04W 76/34 |
| 2024/0388902 A1* | 11/2024 | Khare | H04L 63/0853 |
| 2025/0112780 A1* | 4/2025 | Baskaran | H04W 8/08 |

OTHER PUBLICATIONS

3GPP TS 31.102 V16.4.0, "3rd Generation Partnership Project; Technical Specification Group Core Network and Terminals; Characteristics of the Universal Subscriber Identity Module (USIM) application (Release 16)", 3GPP TS 31.102 V16.4.0, Jun. 2020.

3GPP TS 33.501 V16.4.0, "3rd Generation Partnership Project; Technical Specification Group Services and System Aspects; Security architecture and procedures for 5G system (Release 16)", 3GPP TS 33.501 V16.4.0, Sep. 2020.

3GPP TS 33.501 V15.9.0, "3rd Generation Partnership Project; Technical Specification Group Services and System Aspects; Security architecture and procedures for 5G system (Release 15)", 3GPP TS 33.501 V15.9.0, Jul. 2020.

* cited by examiner

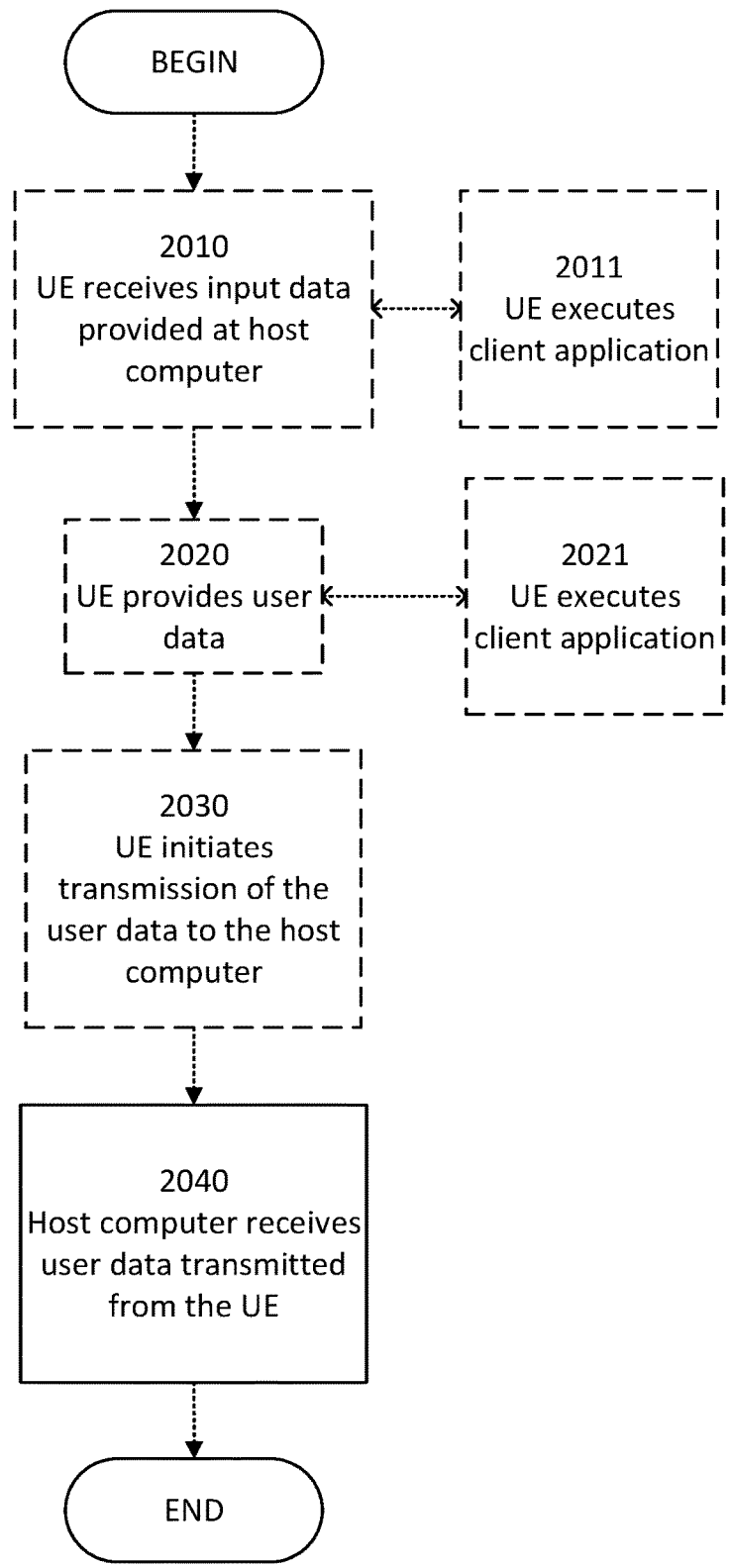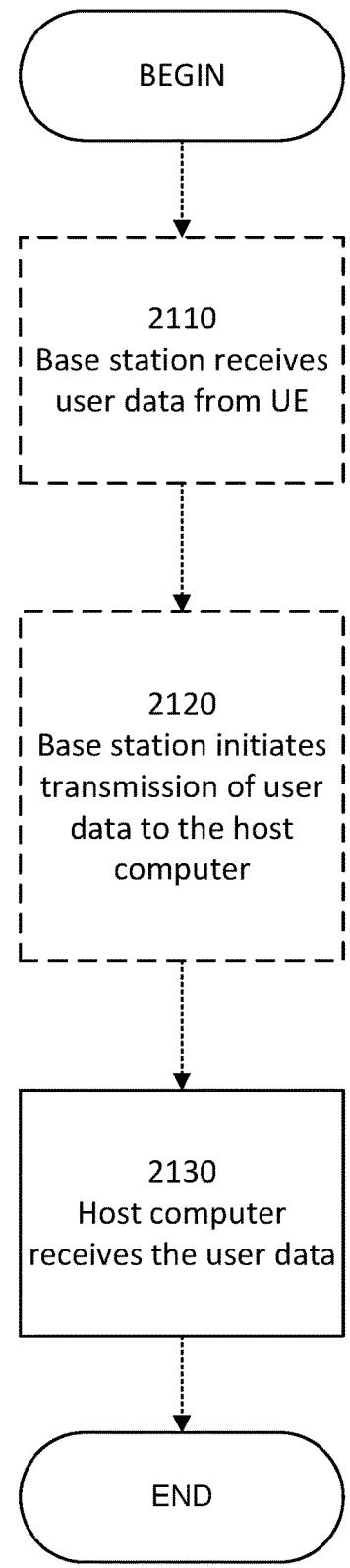
FIG. 20
FIG. 21

| Identifier: '4F03' | Structure: linear fixed | Optional |
|---|---|---|
| SFI: '03' | | |
| Record size: X bytes (X≥57) | Update activity: high | |

Access Conditions:
    READ              PIN
    UPDATE        PIN
    DEACTIVATE  ADM
    ACTIVATE    ADM

| Bytes | Description | M/O | Length |
|---|---|---|---|
| 1 to X | 5GS NAS Security Context TLV Object | M | X bytes |

FIG. 22

| Description | Tag Value |
|---|---|
| 5GS NAS Security Context Tag | 'A0' |

FIG. 23

| Description | Value | M/O | Length (bytes) |
|---|---|---|---|
| 5GS NAS Security Context Tag | 'A0' | M | 1 |
| Length (length of all subsequent data) | Y | M | Note 1 |
| ngKSI Tag | '80' | M | 1 |
| Length | K | M | Note 1 |
| ngKSI | -- | M | K |
| $K_{AMF}$ Tag | '81' | M | 1 |
| Length | L | M | Note 1 |
| $K_{AMF}$ | -- | M | L |
| Uplink NAS count Tag | '82' | M | 1 |
| Length | M | M | Note 1 |
| Uplink NAS count | -- | M | M |
| Downlink NAS count Tag | '83' | M | 1 |
| Length | N | M | Note 1 |
| Downlink NAS count | -- | M | N |
| Identifiers of selected NAS integrity and encryption algorithms Tag | '84' | M | 1 |
| Length | S | M | Note 1 |
| Identifiers of selected NAS integrity and encryption algorithms | -- | M | S |
| Identifiers of selected EPS NAS integrity and encryption algorithms for use after mobility to EPS Tag | '85' | M | 1 |
| Length | U | M | Note 1 |
| Identifiers of selected EPS NAS integrity and encryption algorithms for use after mobility to EPS | -- | M | U |
| Note 1: The length is coded according to ISO/IEC 8825-1 [35] ||||

FIG. 24

| Identifier: '4F04' | Structure: linear fixed | | Optional |
|---|---|---|---|
| SFI: '04' | | | |
| Record size: X bytes (X≥57) | Update activity: high | | |
| Access Conditions:<br>    READ            PIN<br>    UPDATE       PIN<br>    DEACTIVATE  ADM<br>    ACTIVATE     ADM ||||
| Bytes | Description | M/O | Length |
| 1 to X | 5GS NAS Security Context TLV Object | M | X bytes |

FIG. 25

HANDLING REGISTRATIONS OF A USER EQUIPMENT IN DIFFERENT COMMUNICATION NETWORKS

PRIORITY CLAIM

This application is a national stage application of International Patent Application No. PCT/IB2021/058695, filed Sep. 23, 2021, which claims priority to U.S. Provisional Patent Application No. 63/081,972, filed Sep. 23, 2020, the disclosure disclosures of which are hereby incorporated in their entirety by reference.

TECHNICAL FIELD

The present disclosure is related to wireless communication systems and more particularly to communication methods and related devices and nodes supporting wireless communications.

BACKGROUND 5G is a next generation of mobile networks developed by a standards developing organization called the 3rd Generation Partnership Project ("3GPP"). The earlier generations of mobile networks were called 4th Generation ("4G")/Long Term Evolution ("LTE"), Third Generation ("3G")/Universal Mobile Telecommunications System ("UMTS"), and $2^{nd}$ Generation ("2G")/Global System for Mobile Communications ("GSM"). A 5G network is maintained and its services are offered by Mobile Network Operators ("MNOs"). The mobile network can be referred to as Public Land Mobile Network ("PLMN"). To use a particular PLMN offered by a particular MNO, users are required to have a contractual relationship with that MNO, which can be referred to as a subscription. When the user lacks a subscription to a particular MNO (e.g., in a roaming scenario), the relationship is achieved by roaming agreements between the MNO where the user has a subscription (e.g., the user's Home PLMN ("HPLMN")) and the MNO that the user is being served (e.g., the Visited PLMN ("VPLMN")). The VPLMN can be referred to as a Serving PLMN ("SPLMN") or Roaming PLMN ("RPLMN").

3GPP TS 23.501 defines an architecture for 5G. 5G can be access agnostic meaning that the access network ("AN") can use 3GPP base stations (part of Radio Access Network ("RAN")) or non-3GPP access points of wireless local area network ("LAN"). FIG. 1 illustrates an example of a 5G system architecture described in 3GPP TS 23.501. In this example, the 5G network includes a network slice selection function ("NSSF") 102, a network exposure function ("NEF") 110, a network repository function ("NRF") 104, a policy charging function ("PCF") 130, a unified data management ("UDM") 106, application function ("AF") 120, an authentication server function ("AUSF") 108, an access and mobility management function ("AMF") 140, and a session management function ("SMF") 150, which are all communicatively coupled to each other. The 5G network can further include a radio access network ("RAN") 114 and a user equipment ("UE") 112 that are communicatively coupled to each other as well as AMF 140. The 5G network can further include a user plane function ("UPF") 160 communicatively coupled to the RAN 114 and the SMF 150. The 5G network can further include a definition network ("DN") 116 communicatively coupled to the UPF 160.

FIG. 2 illustrates a non-roaming architecture for a 5G Core Network with non-3GPP access as described in 3GPP TS 23.501. In 5G, according to TS 33.501 Rel-15, there are two cases where a UE can be multiply registered in different PLMN's serving networks or in the same PLMN's serving networks. In the case of multiple registrations in different PLMN's, the UE shall independently maintain and use two different 5G security contexts, one per PLMN's serving network. However, some UEs are unable to properly store the two different 5G security contexts in a USIM of the UE, which can cause security and registration issues when the UE attempts to access the different PLMNs.

SUMMARY

According to some embodiments, a method performed by a user equipment (UE), of handling registrations of the UE in different wireless communication networks. The method includes obtaining information indicating whether a Universal Subscriber Identity Module (USIM) of the UE supports storing multiple different Non-Access Stratum (NAS) security contexts of the UE associated with the different wireless communication networks. The method further includes determining whether the USIM supports storing the multiple different NAS security contexts of the UE associated with the different wireless communication networks based on the obtained information.

According to other embodiments, UE, computer program, and/or computer program product is provided for performing one or more of the above methods.

In various embodiments described herein, a security issue associated with re-use of NAS COUNT values used with the same NAS security key is overcome.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 20 is a block diagram of methods implemented in a communication system including a host computer, a base station and a user equipment in accordance with some embodiments;

FIG. 21 is a block diagram of methods implemented in a communication system including a host computer, a base station and a user equipment in accordance with some embodiments;

FIG. 22 is a table illustrating an example of a 5GS 3GPP Access NAS Security Context File in accordance with some embodiments;

FIG. 23 is a table illustrating an example of a 5GS Security Context Tag in accordance with some embodiments;

FIG. 24 is a table illustrating an example of 5GS NAS Security Context Information in accordance with some embodiments; and FIG. 25 is a table illustrating an example of a 5GS Non-3GPP NAS Security Context File in accordance with some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
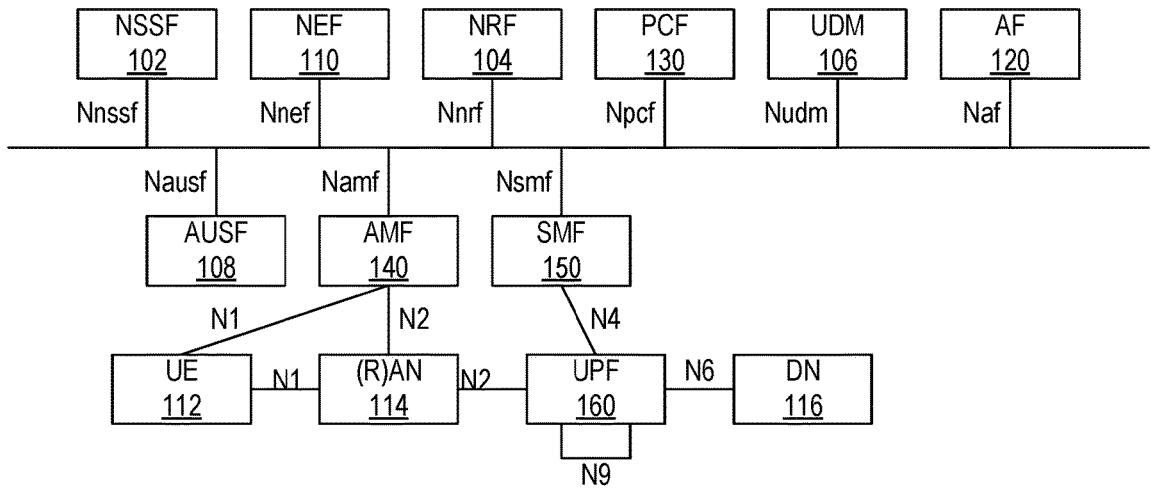
FIG. 1 is a block diagram illustrating an example of a 5G system architecture.
Figure 2:
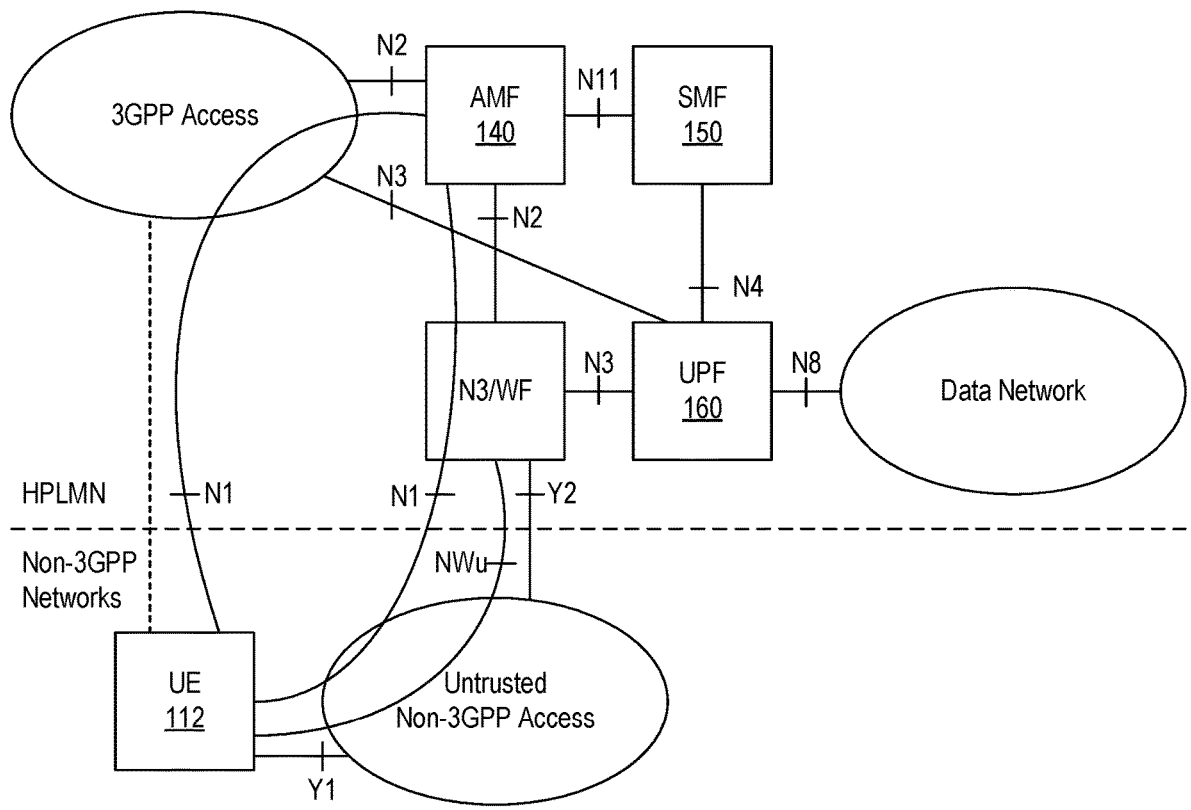
FIG. 2 is a block diagram illustrating an example of a non-roaming architecture for a 5G Core Network with non-3GPP access.
Figures 3, 4:
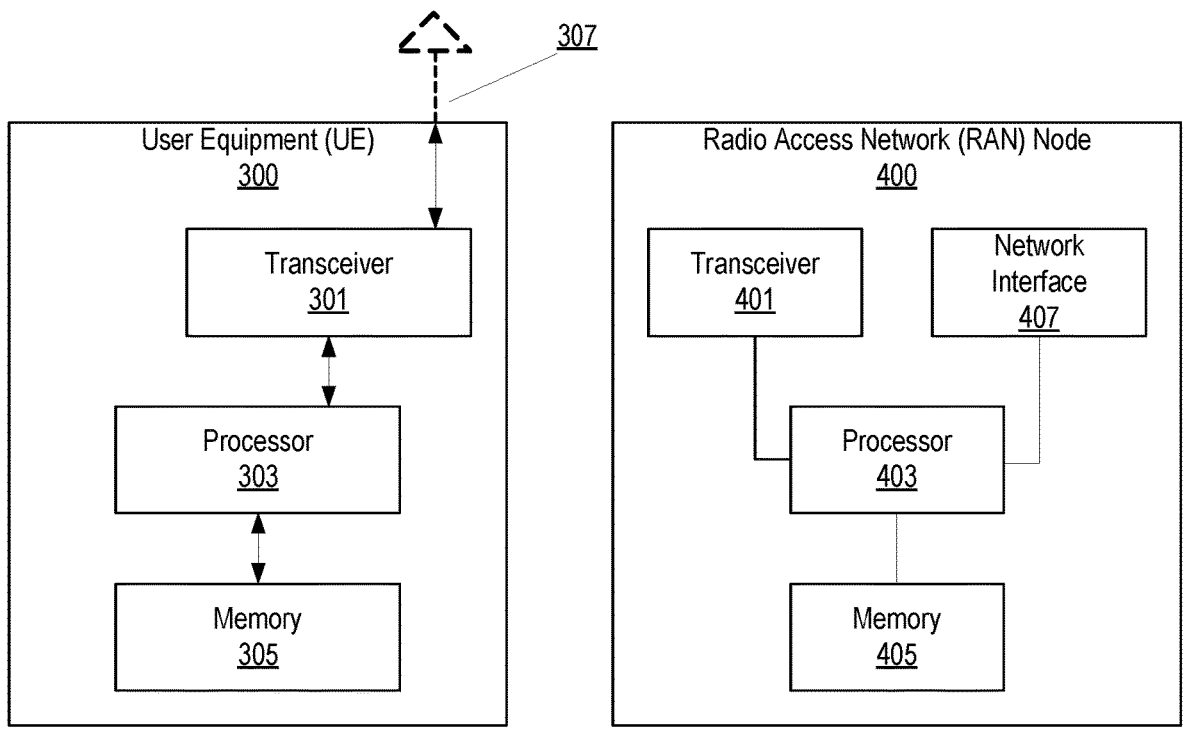
FIG. 3 is a block diagram illustrating an example of a user equipment ("UE") according to some embodiments of the present disclosure.
FIG. 4 is a block diagram illustrating a radio access network ("RAN") node (e.g., a base station eNB/gNB) according to some embodiments of the present disclosure.

FIG. 3 is a block diagram illustrating elements of a UE 300 (also referred to as a mobile terminal, a mobile communication terminal, a wireless device, a wireless communication device, a wireless terminal, mobile device, a wireless communication terminal, communication device, a user equipment node/terminal/device, etc.) configured to provide wireless communication according to embodiments of inventive concepts. (UE 300 may be provided, for example, as discussed below with respect to wireless device 1310 of FIG. 13.) As shown, UE may include an antenna 307 (e.g., corresponding to antenna 1311 of FIG. 13), and transceiver circuitry 301 (also referred to as a transceiver, e.g., corresponding to interface 1314 of FIG. 13) including a transmitter and a receiver configured to provide uplink and downlink radio communications with a base station(s) (e.g., corresponding to network node 1360 of FIG. 13, also referred to as a RAN node) of a radio access network. UE may also include processing circuitry 303 (also referred to as a processor, e.g., corresponding to processing circuitry 1320 of FIG. 13) coupled to the transceiver circuitry, and memory circuitry 305 (also referred to as memory, e.g., corresponding to device readable medium 1330 of FIG. 13) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. UE may also include an interface (such as a user interface) coupled with processing circuitry 303, and/or UE may be incorporated in a vehicle.

As discussed herein, operations of UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices).

FIG. 4 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 1360 of FIG. 13.) As shown, the RAN node may include transceiver circuitry 401 (also referred to as a transceiver, e.g., corresponding to portions of interface 1390 of FIG. 13) including a transmitter and a receiver configured to provide uplink and downlink radio communications with mobile terminals. The RAN node may include network interface circuitry 407 (also referred to as a network interface, e.g., corresponding to portions of interface 1390 of FIG. 13) configured to provide communications with other nodes (e.g., with other base stations) of the RAN and/or core network CN. The network node may also include processing circuitry 403 (also referred to as a processor, e.g., corresponding to processing circuitry 1370) coupled to the transceiver circuitry, and memory circuitry 405 (also referred to as memory, e.g., corresponding to device readable medium 1380 of FIG. 13) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes).

According to some other embodiments, a network node may be implemented as a core network CN node without a transceiver. In such embodiments, transmission to a wireless UE may be initiated by the network node so that transmission to the wireless UE is provided through a network node including a transceiver (e.g., through a base station or RAN node). According to embodiments where the network node is a RAN node including a transceiver, initiating transmission may include transmitting through the transceiver.

Figures 5, 6:
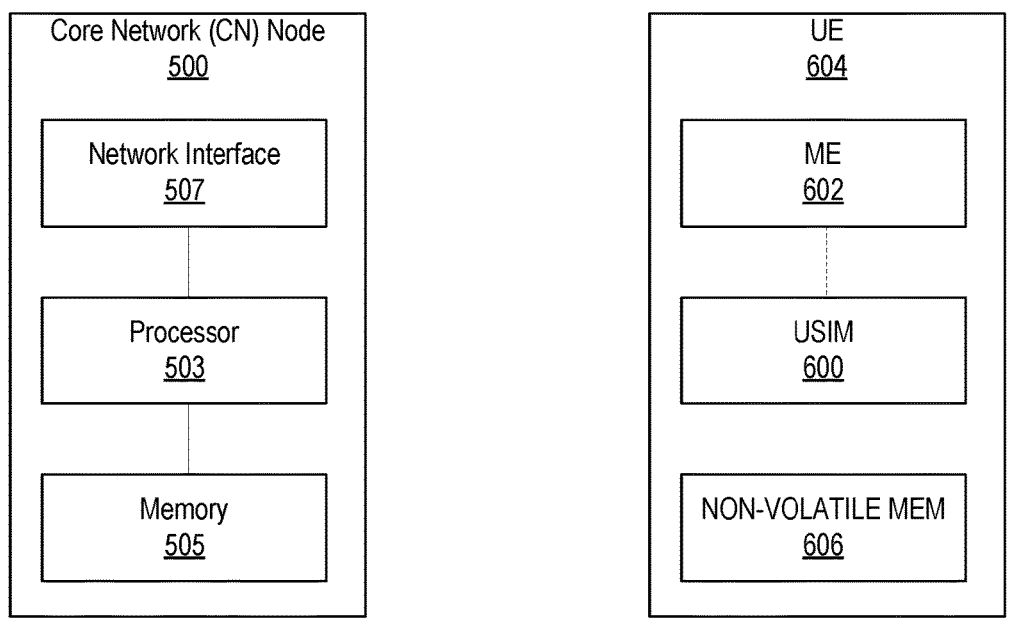
FIG. 5 is a block diagram illustrating a core network ("CN") node (e.g., an AMF node, an SMF node, etc.) according to some embodiments of the present disclosure.
FIG. 6 is a block diagram illustrating a wireless device UE according to some embodiments of the present disclosure.

FIG. 5 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes).

Users wirelessly access a 5G network over-the-air using wireless device known as User Equipment (UE). The UE can include several parts or components that altogether enables the users of the UE to access the services provided by the network. The present disclosure describes in distinguishing two parts of the UE on a high level, which will assist in understanding the rest of the present disclosure. Those two parts are the Universal Subscriber Identity Module ("USIM") 600 and the Mobile Equipment ("ME") 602 of UE 604 illustrated in FIG. 6. It should be understood that FIG. 6 illustrates a high level distinction of these parts of a UE. It should also be understood that UE 604 and UE 300 described above are comprised in the same UE throughout the present disclosure.

The USIM part is a special software application that provides various functions like providing identifier and authentication of the user's subscription, security key generations, etc. The USIM runs on a tamper resistant secure hardware component, e.g., a Universal Integrated Circuit Card (UICC). The ME part denotes the wireless device comprising of hardware and software needed to communicate with the network. For example, the ME comprises a mobile phone or a smart phone.

In 5G, according to TS 33.501 Rel-15, there are two cases where the UE can be multiple registered in different PLMN's serving networks or in the same PLMN's serving networks. The first case is when the UE is registered in one PLMN serving network over a certain type of access (e.g. 3GPP) and is registered to another PLMN serving network over the other type of access (e.g. non-3GPP). The second case is where the UE is registered in the same AMF in the same PLMN serving network over both 3GPP and non-3GPP accesses. The UE will establish two NAS connections with the network in both cases. The UE uses the same subscription credential(s) for multiple registrations in the same or different serving networks.

In the case of multiple registrations in different PLMN's, the UE shall independently maintain and use two different 5G security contexts, one per PLMN's serving network. Each security context shall be established separately via a successful primary authentication procedure with the Home PLMN. The ME shall store the two different 5G security contexts on the USIM if the USIM supports the 5G parameters storage. If the USIM does not support the 5G parameters storage, then the ME shall store the two different 5G security contexts in the ME non-volatile memory. Both of the two different 5G security contexts are current 5G security context.

According to TS 31.102 Rel-15, the USIM can store a NAS security context for the 5GS 3GPP access including one NAS COUNT pair, and a second NAS security context for the 5GS non-3GPP access including one NAS COUNT pair as described in clause 4.4.11.4 and clause 4.4.11.5 as follows. This implies that in total two NAS COUNT pairs can be stored on USIM as follows.

NAS security context for the 5GS 3GPP access is described below. This is defined in clause 4.4.11.4 $EF_{5GS3GPPNSC}$ (5GS 3GPP Access NAS Security Context) as described below. If service n° 122 is "available" in $EF_{UST}$, this file shall be present. This EF contains the 5GS 3GPP access NAS security context as defined in TS 24.501, consisting of KAMF with the associated key set identifier, the UE security capabilities, and the uplink and downlink NAS COUNT values. This EF also contains the EPS NAS security algorithms to be used when the UE goes to EPS, either by means of connected mode handover in a network that supports N26 interface, or by the means of idle mode mobility performed by the UE from 5GS to EPS, as specified in TS 33.501. This file shall contain, for example, one record as shown in the table in FIG. 22. The table in FIG. 23 illustrates an example 5GS Security Context Tag. The table in FIG. 24 illustrates and example of 5GS NAS Security Context Information.

NAS security context for the 5GS non-3GPP access is described below. This is defined in clause 4.4.11.5 $EF_{5GSN3GPPNSC}$ (5GS non-3GPP Access NAS Security Context) as described below. If Service n° 122 is "available" in $EF_{UST}$, this file shall be present. This EF contains the 5GS non-3GPP access NAS security context as defined in TS 24.501, consisting of KAMF with the associated key set identifier, the UE security capabilities, and the uplink and downlink NAS COUNT values. This EF also contains the EPS NAS security algorithms to be used when the UE goes to EPS, either by means of connected mode handover in a network that supports N26 interface, or by the means of idle mode mobility performed by the UE from 5GS to EPS, as specified in TS 33.501. This file shall contain, for example, one record as shown in the table in FIG. 25. For example, content and coding, see clause 4.4.11.4 for $EF_{5GS3GPPNSC}$.

According to TS 33.501 Rel-15, clause 6.3.2.1 Multiple registrations in different PLMNs, the USIM shall store two different 5G security contexts on the USIM if the USIM supports the 5G parameters storage.

In the case of multiple registrations in different PLMN's, the UE shall independently maintain and use two different 5G security contexts, one per PLMN's serving network. Each security context shall be established separately via a successful primary authentication procedure with the Home PLMN.

The ME shall store the two different 5G security contexts on the USIM if the USIM supports the 5G parameters storage. If the USIM does not support the 5G parameters storage, then the ME shall store the two different 5G security contexts in the ME non-volatile memory. Both of the two different 5G security contexts are current 5G security context.

However, the USIM specification TS 31.102 does not fulfill the requirement defined in TS 33.501 as it does not support the storage of two different 5G security contexts (in total four NAS COUNTs pair) to be used in two different PLMNs. In other words, the problem is that there should be separate context (with two pairs of NAS count) per PLMN, but USIM has storage only for one PLMN. So, ME's behavior is undefined, and it can cause a problem as shown below in operation 4:1) ME registers with PLMN 1 over 3GPP and non-3GPP, and therefore has two NAS COUNT pairs; 2) ME deregisters from PLMN 1 over non-3GPP, and still has two NAS COUNT pairs; 3) ME registers with PLMN 2 over non-3GPP, and therefore has three NAS COUNT pairs; and 4) ME turns off and has to stores three NAS COUNTS to USIM. The USIM does not have storage for those.

In operation 4 above, one NAS COUNT for non-3GPP may overwrite another. This overwrite of NAS COUNT may create a mix of NAS security context between PLMNs, e.g., NAS COUNT of 3GPP for PLMN 1 and NAS COUNT of non-3GPP for PLMN 2. The overwrite could also be such that all NAS COUNTs of PLMN 1 are overwritten by those of PLMN 2.

A Rel-15 USIM can only store one NAS security context for 3GPP access and non-3GPP access i.e. in total two NAS COUNT pairs. There could also be USIMs that cannot be updated to meet the requirement of storing multiple NAS security contexts for 3GPP access and non-3GPP access. The present disclosure describes how the ME shall behave when a Rel-15 USIM or a USIM that does not support storing multiple NAS security contexts for 3GPP access and non-3GPP access is inserted into UE. The present disclosure also describes how the ME shall store two separate NAS security contexts for 3GPP access and non-3GPP access i.e. store in total four NAS COUNT's pairs, used with two different PLMN's.

The security issue described above about the problem caused by overwrite and mix NAS COUNT values is solved using the methods and devices described herein. The present disclosure proposes that the ME is able to store a second NAS security context for 3GPP access and non-3GPP access (in total two NAS COUNTs pairs), used with a second PLMN 2 AMF different to the first NAS security context for 3GPP access and non-3GPP access used with a first PLMN 1 AMF. In total this means that the ME can store four NAS COUNT pairs. This means that NAS COUNT values used over a non-3GPP access in PLMN 1 AMF can be stored (either on USIM or ME) if the ME is registers with a PLMN 2 AMF over non-3GPP access and then is switched off.

If the ME is switched on in PLMN 2 AMF over non-3GPP access and moves back to PLMN 1 AMF over non-3GPP access or the ME is switched on in PLMN 1 AMF, then the ME reads out the latest used NAS count value used with PLMN 1 AMF over non-3GPP access. If the NAS security key has not changed, then this means that there will be no re-use of the NAS count values used with the same NAS security key. This solves the security issue described above.

The USIM may be updated to fulfill the requirement defined in TS 33.501 to support the storage of multiple 5G security contexts to be used in multiple PLMNs. However, there could be USIMs that are not updated or cannot be updated. In such cases, the earlier mentioned problem remains. To solve this issue, the ME obtains information that determines if USIM can store NAS security context per PLMN. In some embodiments, the ME obtains the information by determining if a certain service is available in USIM's EF_UST (Elementary File USIM Service Table). The certain service could be a new one or updated definition of existing one.

In some embodiments, the ME obtains the information by determining if there are multiple EFs available in USIM for different PLMN, or if it is possible to store multiple EFs by indicating them to belong to certain PLMN. The ME obtains the information by determining if there are multiple fields for NAS COUNTs for different PLMNs, or if it is possible to store multiple NAS COUNTs by indicating them to belong to certain PLMN according to some embodiments. In some embodiments, the ME obtains the information by determining if there is some field in USIM to indicate which security context belong to which PLMN.

In some embodiments, the ME obtains the information by determining the length or size of EFs (Elementary File) such as EF_5GS3GPPNSC (5GS 3GPP Access NAS Security Context) and EF_5GSN3GPPNSC (5GS non-3GPP Access NAS Security Context). Longer length could mean that NAS security context multiple PLMNs are supported. In some embodiments, the ME obtains the information by determining how many records are supported or present in EFs such as EF_5GS3GPPNSC and EF_5GSN3GPPNSC. Multiple records could mean that NAS security context multiple PLMNs are supported.

On obtaining information that the USIM does support storing NAS security context per PLMN, the ME stores multiple NAS security contexts to the USIM. One example of storing would be to store the contexts in multiple EFs or multiple records in EFs (two separate NAS security contexts for 3GPP access and non-3GPP access i.e. in total four NAS COUNT's pairs). On obtaining information that the USIM does not support storing NAS security context per PLMN, the ME uses its non-volatile memory. In some embodiments, the ME stores the first NAS security context for 3GPP access and non-3GPP access on the USIM (in total two NAS COUNT pairs are stored on USIM). Further, the ME stores the second NAS security context for 3GPP access and non-3GPP access, in the ME's non-volatile memory (in total two NAS COUNT pairs are stored in ME).

In some embodiments, the ME stores both the first NAS security context for 3GPP access and non-3GPP access and the second NAS security context for 3GPP access and non-3GPP access in the ME's non-volatile memory, i.e. in total four NAS COUNT pairs are stored in ME. In this embodiment, none of the two NAS security contexts are stored in the USIM. In some embodiments, the ME stores, in the ME non-volatile memory, indication of which PLMN is related to the NAS security context that is present in the USIM and which PLMN is related to NAS security context that is present in the ME's non-volatile memory.

Operations of the wireless device 300 and UE 604 (implemented using the structure of the block diagram of FIGS. 3 and 6 respectively) will now be discussed with reference to the flow chart of FIGS. 7-12 according to some embodiments of the present disclosure. For example, modules may be stored in memory 305 of FIG. 3, and these modules may provide instructions so that when the instructions of a module are executed by respective UE processing circuitry 303, processing circuitry 303 performs respective operations of the flow chart. As discussed above, UE 604 illustrated in FIG. 6 provides a high level overview of wireless device 300. For example, ME 602 represents a high level representation of the transceiver 301, processing circuitry 303, memory 305, and antenna 307 of wireless device 300, or essentially the hardware components of the wireless device 300. Although not illustrated in FIG. 3, it should be understood that wireless device 300, as represented at a high level in FIG. 6, comprises USIM 600 and non-volatile memory 606 and is assumed throughout the present disclosure.

Figure 7:
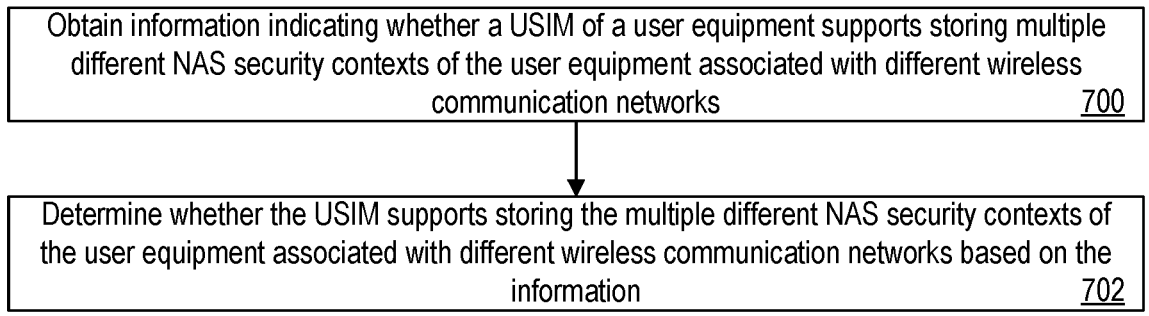
FIG. 7 is a flow chart illustrating operations of a wireless device according to some embodiments of the present disclosure.

FIG. 7 illustrates a method of handling registrations of the wireless device in different wireless communication networks according to embodiments of the present disclosure. FIG. 7 illustrates the method includes obtaining 700 information indicating whether a Universal Subscriber Identity Module (USIM) of the wireless device can store multiple different Non-Access Stratum (NAS) security contexts of the wireless device associated with the different wireless communication networks. In some embodiments, the different wireless communication networks comprise a first Public Land Mobile Network (PLMN) and a second PLMN different from the first PLMN. For example, wireless device 300 illustrated in FIG. 3 operates to obtain information indicating whether USIM 600 of the wireless device 300 can store multiple different NAS security contexts of wireless device 300 associated with the different wireless communication networks.

In some embodiments, the method includes obtaining the information by determining whether a certain service is available in an Elementary File USIM Service Table (EF_UST) of the USIM, the certain service comprising one of a new service or an updated definition of an existing service previously defined in the EF_UST. For example, the wireless device 300 illustrated in FIG. 3 operates to determine whether a certain service is available in the EF_UST of USIM 600. In some embodiments, the method includes obtaining the information by determining whether multiple Elementary Files (EFs) are available in the USIM for the different wireless communication networks. For example, wireless device 300 illustrated in FIG. 3 operates to determine whether multiple EFs are available in USIM 600 for the different wireless communication networks.

The method includes obtaining the information by determining whether the USIM is configured to store multiple EFs with indications that each EF of the multiple EFs are associated with a respective wireless communication network of the different wireless communication networks in some embodiments. For example, wireless device 300 operates to determine whether USIM 600 is configured to store multiple EFs with indications that each EF of the multiple EFs are associated with a respective wireless communication network of the different wireless communication networks. In some embodiments, the method includes obtaining the information by determining whether multiple fields for NAS COUNTs are available in the USIM for the different wireless communication networks. In another example, the wireless device operates to determine whether multiple fields for NAS COUNTs are available in USIM 600 for the different wireless communication networks.

In some embodiments, the method includes obtaining the information by determining whether the USIM is configured to store multiple NAS COUNTs for each wireless communication network of the different wireless communication networks. In another example, wireless device 300 operates to determine whether USIM 600 is configured to store multiple NAS COUNTs for each wireless communication network of the different wireless communication networks. The method includes obtaining the information by determining whether a field in the USIM indicates which NAS security context of the different NAS security contexts belongs to which wireless communication network of the different wireless communication networks according to some embodiments. For example, wireless device 300 determines whether a field in USIM 600 indicates which NAS security context of the different NAS security contexts belongs to which wireless communication network of the different wireless communication networks.

According to some embodiments, the method includes obtaining the information by determining whether a size of EFs associated with the different wireless communication networks indicate that different NAS security contexts associated with the different wireless communication networks is supported. In another example, wireless device 300 determines whether a size of EFs associated with the different wireless communication networks indicate that different NAS security contexts associated with the different wireless communication networks is supported. In some embodiments, each NAS security context of the different NAS security contexts comprise a 3GPP Access NAS Security Context and a non-3GPP Access NAS Security Context of the wireless device for a wireless communication network of the different wireless communication networks. The method includes obtaining the information by determining whether multiple records are one of supported or present in EFs associated with the different wireless communication networks in some embodiments. For example, wireless device 300 determines whether multiple records are one of supported or present in EFs associated with the different wireless communication networks.

Figure 8:
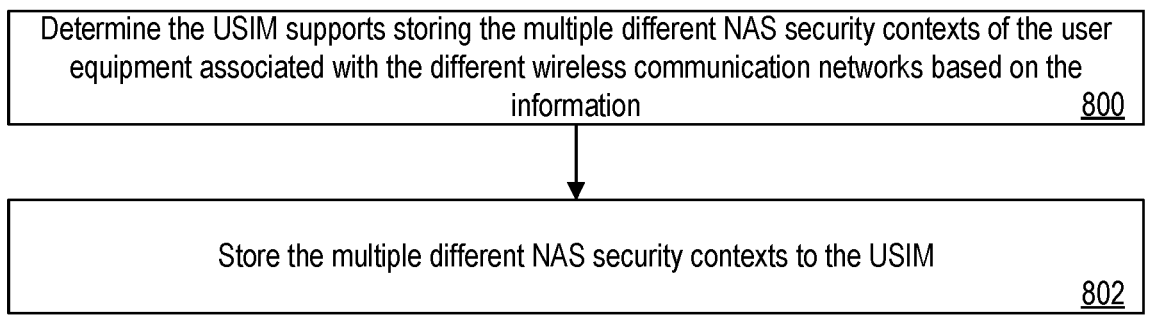
FIG. 8 is a flow chart illustrating operations of a wireless device determining a USIM supports storing multiple different NAS security contexts according to some embodiments of the present disclosure.

Returning to FIG. 7, the method includes determining 702 whether the USIM supports storing the multiple different NAS security contexts of the wireless device associated with the different wireless communication networks based on the obtained information. For example, wireless device 300 illustrated in FIG. 3 operates to determine whether USIM 600 supports storing the multiple different NAS security contexts of wireless device 300 associated with the different wireless communication networks based on the obtained information. FIG. 8 illustrates an embodiment in which the method includes determining 800 the USIM supports storing the multiple different NAS security contexts of the wireless device associated with the different wireless communication networks based on the obtained information. For example, wireless device 300 determines USIM 600 storing the multiple different NAS security contexts of wireless device 300 associated with the different wireless communication networks based on the obtained information.

FIG. 8 also illustrates the method includes storing 802 the multiple different NAS security contexts to the USIM in this embodiment. Continuing the previous example, wireless device 300 stores the multiple different security contexts to USIM 600. In some embodiments, the method includes storing the multiple different NAS security contexts to the USIM in one of multiple EFs or multiple records in EFs associated with each wireless communication network of the different wireless communication networks. For example, wireless device 300 stores multiple different NAS security contexts to USIM 600 in one of multiple EFs or multiple records in EFs associated with each wireless communication network of the different wireless communication networks.

Figure 9:
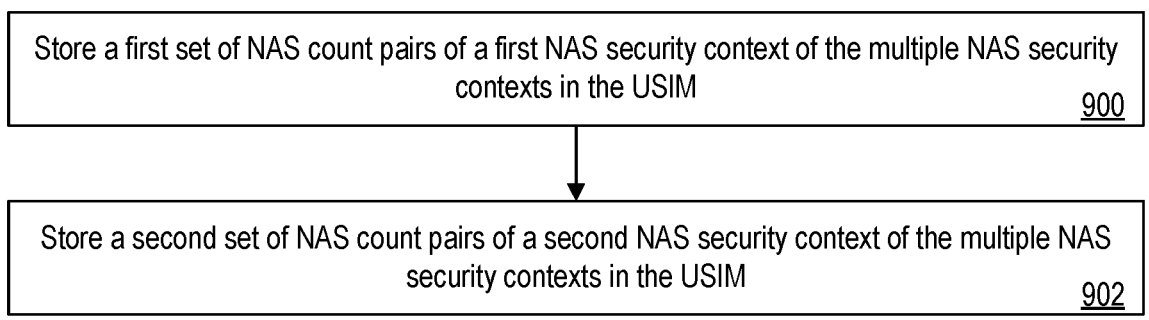
FIG. 9 is a flow chart illustrating operations of a wireless device storing a first set and a second set of NAS COUNT pairs according to some embodiments of the present disclosure.

FIG. 9 illustrates the method includes storing 900 a first set of NAS COUNT pairs of a first NAS security context of the multiple NAS security contexts in the USIM. In this embodiment, the first NAS security context is associated with a first wireless communication network of the different wireless networks according to some embodiments. FIG. 9 also illustrates the method includes storing 902 a second set of NAS COUNT pairs of a second NAS security context of the multiple NAS security contexts in the USIM in this embodiment. Also, the second NAS security context associated with a second wireless communication network of the different wireless networks in this embodiment.

Continuing the previous example, wireless device 300 stores a first set of NAS COUNT pairs of a first NAS security context of the multiple NAS security contexts in USIM 600. The wireless device 300 also stores a second set of NAS COUNT pairs of a second NAS security context of the multiple NAS security contexts in USIM 600 in this example. In some embodiments, the first set NAS COUNT pairs is associated with a 3GPP access and non-3GPP access of the first wireless communication network and the second set of NAS COUNT pairs is associated with a 3GPP access and non-3GPP access of the second wireless communication network.

Figure 10:
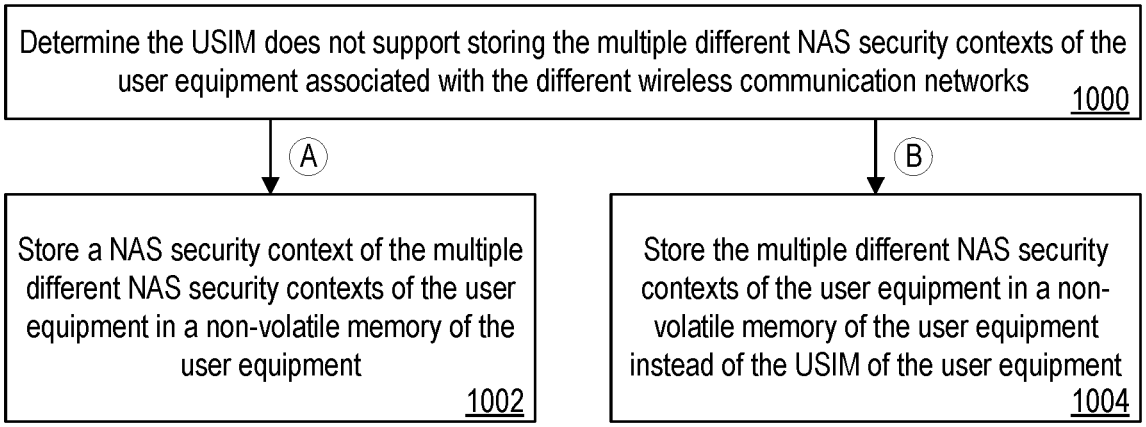
FIG. 10 is a flow chart illustrating operations of a wireless device determining the USIM does not support storing the multiple different NAS security contexts of the wireless device according to some embodiments of the present disclosure.

FIG. 10 illustrates an embodiment in which the method includes determining 1000 the USIM does not support storing the multiple different NAS security contexts of the wireless device associated with the different wireless communication networks. For example, wireless device determines that USIM 600 does not support storing the multiple different NAS security contexts of the wireless device associated with the different wireless communication networks. In one embodiment, FIG. 10 illustrates the method includes storing 1002 a NAS security context of the multiple different NAS security contexts of the wireless device in a non-volatile memory of the wireless device in response to determining the USIM does not support storing the multiple different NAS security contexts. For example, wireless device 300 stores a NAS security context of the multiple different NAS security contexts of wireless device 300 in non-volatile memory 606 of wireless device 300 in response to determining USIM 600 does not support storing the multiple different NAS security contexts. In this example, non-volatile memory 606 is comprised one of within memory 305 or separate from memory 305 of wireless device 300.

Figure 11:
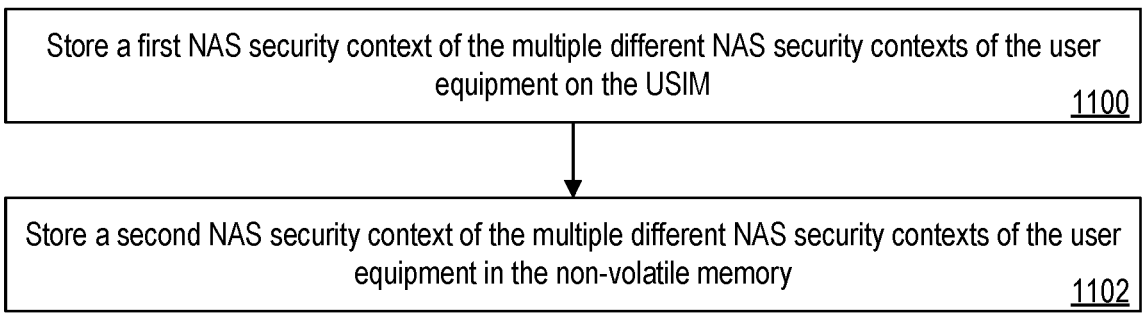
FIG. 11 is a flow chart illustrating operations of a wireless device storing a first NAS security context of the multiple different NAS security contexts of the wireless device on the USIM according to some embodiments of the present disclosure.

FIG. 11 also illustrates the method includes storing 1100 a first NAS security context of the multiple different NAS security contexts of the wireless device on the USIM according to some embodiments. FIG. 11 further illustrates the method includes storing 1102 second NAS security context of the multiple different NAS security contexts of the wireless device in the non-volatile memory in some embodiments. In this embodiment, the first NAS security context is associated with a first communication network of the different wireless communication networks and the second NAS security context is associated with a second communication network of the different wireless communication networks. Continuing the previous example, wireless device 300 stores the first NAS security context in USIM 600 and the second NAS security context of in non-volatile memory 606. In this example, the USIM 600 only has storage for one NAS security context of a PLMN, so additional NAS security contexts for other PLMNs are stored in the non-volatile memory 606.

In some embodiments, the method includes storing a first set of NAS COUNT pairs of the first NAS security context in the USIM and storing a second set of NAS COUNT pairs of a second NAS security in the non-volatile memory. Continuing the previous example, wireless device 300 stores a first set of NAS COUNT pairs of the first NAS security context in USIM 600 and stores a second set of NAS COUNT pairs of the second NAS security context in non-volatile memory 606. In some embodiments, the first set of NAS COUNT pairs is associated with a 3GPP access and non-3GPP access of the first wireless communication network and the second set of NAS COUNT pairs is associated with a 3GPP access and non-3GPP access of the second wireless communication network.

Figure 12:
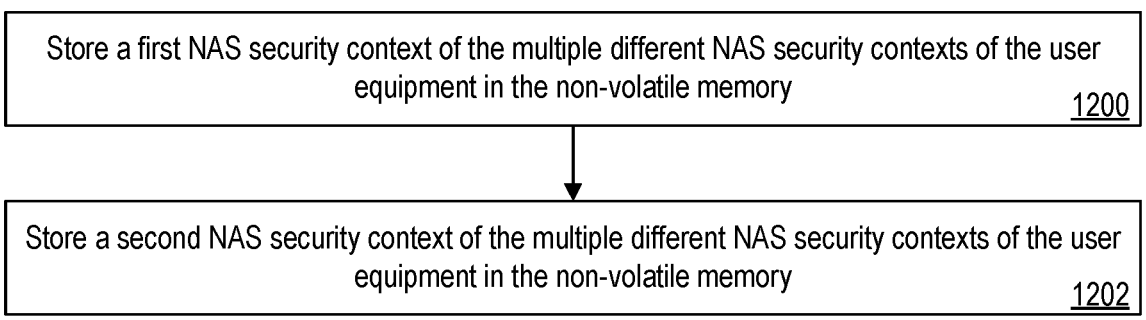
FIG. 12 is a flow chart illustrating operations of a wireless device storing a first NAS security context of the multiple different NAS security contexts of the wireless device in the non-volatile memory according to some embodiments of the present disclosure.

Returning to FIG. 10, the method includes storing 1004 the multiple different NAS security contexts of the wireless device in a non-volatile memory of the wireless device instead of the USIM of the wireless device according to an embodiment of the present disclosure. For example, wireless device 300 stores the multiple different NAS security contexts of wireless device 300 in non-volatile memory 606 instead of USIM 600. FIG. 12 illustrates the method includes, in some embodiments, storing 1200 a first NAS security context of the multiple different NAS security contexts of the wireless device in the non-volatile memory. FIG. 12 also illustrates the method includes storing 1202 a second NAS security context of the multiple different NAS security contexts of the wireless device in the non-volatile memory.

In this embodiment, the first NAS security context is associated with a first communication network of the different wireless communication networks and the second NAS security context is associated with a second communication network of the different wireless communication networks. For example, wireless device 300 illustrated in FIG. 3 stores both a first and second NAS security context of the multiple different NAS security contexts of wireless device 300 in non-volatile memory 606. In some embodiments, the first NAS security context comprises a first set of NAS COUNT pairs associated with the first wireless communication network and a second set of NAS COUNT pairs associated with the second wireless communication network. In some embodiments, the first set of NAS COUNT pairs is associated with a 3GPP access and non-3GPP access of the first wireless communication network and the second set of NAS COUNT pairs is associated with a 3GPP access and non-3GPP access of the second wireless communication network.

In some other embodiments, the method includes storing, in the non-volatile memory, an indication that the first wireless communication network is associated with the first NAS security context stored in the USIM and that the second wireless communication network is associated with the second NAS security context stored in the non-volatile memory. For example, wireless device 300 stores, in volatile memory 606, an indication that the first wireless communication network is associate with the first NAS security context stored in USIM 600 and that the second wireless communication network is associated with the second NAS security context stored in non-volatile memory 606.

Methods described herein include operations where the UE uses the stored credential(s) for multiple registrations in the same or different serving networks. In the case of multiple registrations in different PLMN's, the UE may independently maintain and use two different 5G security contexts, one per PLMN's serving network.

Additional example embodiments are discussed below.

Embodiment 1. A method, performed by a wireless device (300, 604), of handling registrations of the wireless device (300, 604) in different wireless communication networks, the method comprising:
 obtaining (700) information indicating whether a Universal Subscriber Identity Module (USIM) (600) of the wireless device (300, 604) can store multiple different Non-Access Stratum (NAS) security contexts of the wireless device (300, 604) associated with the different wireless communication networks; and
 determining (702) whether the USIM (600) supports storing the multiple different NAS security contexts of the wireless device (300, 604) associated with the different wireless communication networks based on the obtained information.

Embodiment 2. The method according to embodiment 1, wherein the different wireless communication networks comprises a first Public Land Mobile Network (PLMN) and a second PLMN different from the first PLMN.

Embodiment 3. The method according to any one of embodiments 1-2, wherein obtaining the information comprises determining whether a certain service is available in a Elementary File USIM Service Table (EF_UST) of the USIM (600), the certain service comprising one of a new service or an updated definition of an existing service previously defined in the EF_UST.

Embodiment 4. The method according to any one of embodiments 1-3, wherein obtaining the information comprises determining whether multiple Elementary Files (EFs) are available in the USIM (600) for the different wireless communication networks.

Embodiment 5. The method according to any one of embodiments 1-4, wherein obtaining the information comprises determining whether the USIM (600) is configured to store multiple EFs with indications that each EF of the multiple EFs are associated with a respective wireless communication network of the different wireless communication networks.

Embodiment 6. The method according to any one of embodiments 1-5, wherein obtaining the information comprises determining whether multiple fields for NAS COUNTs are available in the USIM (600) for the different wireless communication networks.

Embodiment 7. The method according to any one of embodiments 1-6, wherein obtaining the information comprises determining whether the USIM (600) is configured to store multiple NAS COUNTs for each wireless communication network of the different wireless communication networks.

Embodiment 8. The method according to any one of embodiments 1-7, wherein obtaining the information comprises determining whether a field in the USIM (600) indicates which NAS security context of the different NAS security contexts belongs to which wireless communication network of the different wireless communication networks.

Embodiment 9. The method according to any one of embodiments 1-8, wherein obtaining the information comprises determining whether a size of EFs associated with the different wireless communication networks indicate that different NAS security contexts associated with the different wireless communication networks is supported.

Embodiment 10. The method according to any one of embodiments 1-9, wherein each NAS security context of the different NAS security contexts comprise a 3GPP Access NAS Security Context and a non-3GPP Access NAS Security Context of the wireless device for a wireless communication network of the different wireless communication networks.

Embodiment 11. The method according to any one of embodiments 1-10, wherein obtaining the information comprises determining whether multiple records are one of supported or present in EFs associated with the different wireless communication networks.

Embodiment 12. The method according to any one of embodiments 1-11, wherein determining whether the USIM (600) supports storing the multiple different NAS security contexts of the wireless device (300, 604) comprises:
 determining (800) the USIM supports storing the multiple different NAS security contexts of the wireless device (300, 604) associated with the different wireless communication networks based on the obtained information.

Embodiment 13. The method according to any one of embodiments 1-12, further comprising:
 storing (802) the multiple different NAS security contexts to the USIM (600).

Embodiment 14. The method according to any one of embodiments 1-13, wherein storing the multiple different NAS security contexts to the USIM (600) comprises storing the multiple different NAS security contexts to the USIM (600) in one of multiple EFs or multiple records in EFs associated with each wireless communication network of the different wireless communication networks.

Embodiment 15. The method according to any one of embodiments 1-14, wherein storing the multiple different NAS security contexts to the USIM (600) in one of multiple EFs or multiple records in EFs associated with each wireless communication network of the different wireless communication networks comprises:

storing (900) a first set of NAS COUNT pairs of a first NAS security context of the multiple NAS security contexts in the USIM (600), the first NAS security context is associated with a first wireless communication network of the different wireless networks, and storing (902) a second set of NAS COUNT pairs of a second NAS security context of the multiple NAS security contexts in the USIM (600), the second NAS security context is associated with a second wireless communication network of the different wireless networks.

Embodiment 16. The method according to any one of embodiments 1-15, wherein the first set NAS COUNT pairs is associated with a 3GPP access and non-3GPP access of the first wireless communication network, and wherein the second set of NAS COUNT pairs is associated with a 3GPP access and non-3GPP access of the second wireless communication network.

Embodiment 17. The method according to any one of embodiments 1-12, wherein determining whether the USIM (600) supports storing the multiple different NAS security contexts of the wireless device (300, 604) associated with the different wireless communication networks comprises determining (1000) the USIM (600) does not support storing the multiple different NAS security contexts of the wireless device (300, 604) associated with the different wireless communication networks.

Embodiment 18. The method according to any one of embodiments 1-12 and 17, further comprising:

storing (1002) a NAS security context of the multiple different NAS security contexts of the wireless device (300, 604) in a non-volatile memory (606) of the wireless device (300, 604).

Embodiment 19. The method according to any one of embodiments 1-12 and 17-18, wherein storing the NAS security context of the multiple different NAS security contexts of the wireless device (300, 604) in the non-volatile memory (606) of the wireless device (300, 604) comprises storing (1100) a first NAS security context of the multiple different NAS security contexts of the wireless device (300, 604) on the USIM (600), the first NAS security context is associated with a first communication network of the different wireless communication networks, and storing (1102) a second NAS security context of the multiple different NAS security contexts of the wireless device (300, 604) in the non-volatile memory (606), the second NAS security context is associated with a second communication network of the different wireless communication networks.

Embodiment 20. The method according to any one of embodiments 1-12 and 17-19, wherein storing the first NAS security context comprises storing a first set of NAS COUNT pairs of the first NAS security context in the USIM (600), and wherein storing the second NAS security context comprises storing a second set of NAS COUNT pairs of a second NAS security context in the non-volatile memory (606).

Embodiment 21. The method according to any one of embodiments 1-12 and 17-20, wherein the first set of NAS COUNT pairs is associated with a 3GPP access and non-3GPP access of the first wireless communication network, and wherein the second set of NAS COUNT pairs is associated with a 3GPP access and non-3GPP access of the second wireless communication network.

Embodiment 22. The method according to any one of embodiments 1-12 and 17, further comprising:

storing (1004) the multiple different NAS security contexts of the wireless device (300, 604) in a non-volatile memory (606) of the wireless device instead of the USIM (600) of the wireless device (300, 604).

Embodiment 23. The method according to any one of embodiments 1-12, 17, and 22, wherein storing the multiple different NAS security contexts of the wireless device (300, 604) associated with the different wireless communication networks in the non-volatile memory (606) of the wireless device instead of the USIM (600) of the wireless device (300, 604) comprises storing (1200) a first NAS security context of the multiple different NAS security contexts of the wireless device (300, 604) in the non-volatile memory (606), the first NAS security context associated with a first communication network of the different wireless communication networks, and storing (1202) a second NAS security context of the multiple different NAS security contexts of the wireless device (300, 604) in the non-volatile memory (606), the second NAS security context associated with a second communication network of the different wireless communication networks.

Embodiment 24. The method according to any one of embodiments 1-12, 17, and 22-23, wherein the first NAS security context comprises a first set of NAS COUNT pairs associated with the first wireless communication network and a second set of NAS COUNT pairs associated with the second wireless communication network.

Embodiment 25. The method according to any one of embodiments 1-12, 17, and 22-24, wherein the first set of NAS COUNT pairs is associated with a 3GPP access and non-3GPP access of the first wireless communication network, and wherein the second set of NAS COUNT pairs is associated with a 3GPP access and non-3GPP access of the second wireless communication network Embodiment 26. The method according to any one of embodiments 1-12 and 17-19, further comprising:

storing, in the non-volatile memory, an indication that the first wireless communication network is associated with the first NAS security context stored in the USIM (600) and that the second wireless communication network is associated with the second NAS security context stored in the non-volatile memory (606).

Embodiment 27. A wireless device (300, 604) comprising:

processing circuitry (303);

a Universal Subscriber Identity Module, USIM (600); and memory (305) coupled with the processing circuitry, wherein the memory includes instructions that when executed by the processing circuitry causes the wireless device to perform operations according to any of Embodiments 1-26.

Embodiment 28. A wireless device (300, 604) adapted to perform according to any of Embodiments 1-26.

Embodiment 29. A computer program comprising program code to be executed by processing circuitry (303) of a wireless device (300, 604), whereby execution of the program code causes the wireless device (300) to perform operations according to any of embodiments 1-26.

Embodiment 30. A computer program product comprising a non-transitory storage medium including program code to be executed by processing circuitry (303) of a wireless device (300), whereby execution of the program code causes the wireless device (300, 604) to perform operations according to any of embodiments 1-26.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 13:
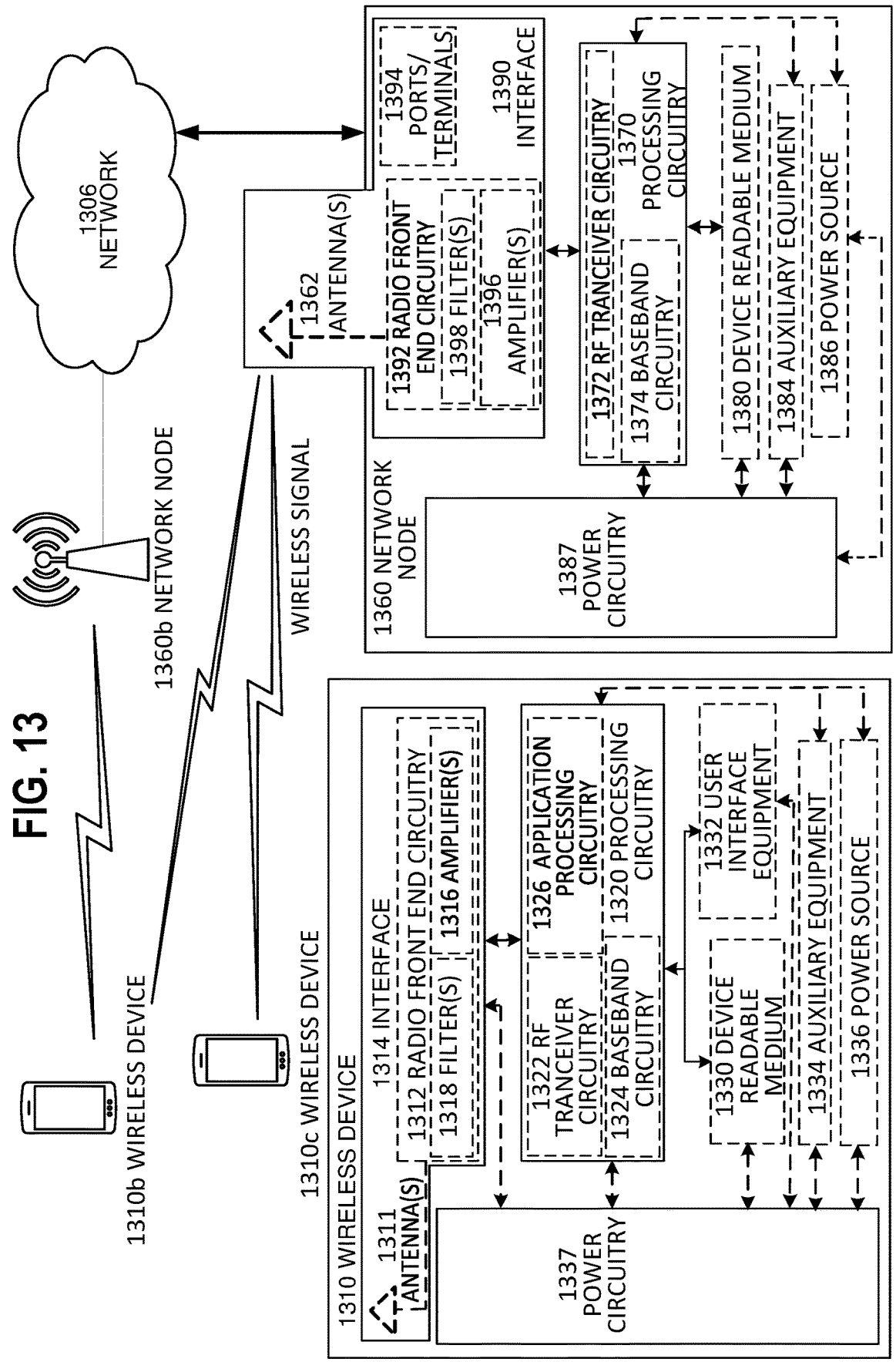
FIG. 13 is a block diagram of a wireless network in accordance with some embodiments.

FIG. 13 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360b, and WDs 1310, 1310b, and 1310c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1360 are depicted as single boxes located within a larger box, or nested within multiple boxes, in practice, a network node may comprise multiple different physical components that make up a single illustrated component (e.g., device readable medium 1380 may comprise multiple separate hard drives as well as multiple RAM modules).

Similarly, network node 1360 may be composed of multiple physically separate components (e.g., a NodeB component and a RNC component, or a BTS component and a BSC component, etc.), which may each have their own respective components. In certain scenarios in which network node 1360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1360 may be configured to support multiple radio access technologies (RATs). In such embodiments, some components may be duplicated (e.g., separate device readable medium 1380 for the different RATs) and some components may be reused (e.g., the same antenna 1362 may be shared by the RATs). Network node 1360 may also include multiple sets of the various illustrated components for different wireless technologies integrated into network node 1360, such as, for example, GSM, WCDMA, LTE, NR, WiFi, or Bluetooth wireless technologies. These wireless technologies may be integrated into the same or different chip or set of chips and other components within network node 1360.

Processing circuitry 1370 is configured to perform any determining, calculating, or similar operations (e.g., certain obtaining operations) described herein as being provided by a network node. These operations performed by processing circuitry 1370 may include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 may execute instructions stored in device readable medium 1380 or in memory within processing circuitry 1370. Such functionality may include providing any of the various wireless features, functions, or benefits discussed herein. In some embodiments, processing circuitry 1370 may include a system on a chip (SOC).

In some embodiments, processing circuitry 1370 may include one or more of radio frequency (RF) transceiver circuitry 1372 and baseband processing circuitry 1374. In some embodiments, radio frequency (RF) transceiver circuitry 1372 and baseband processing circuitry 1374 may be on separate chips (or sets of chips), boards, or units, such as radio units and digital units. In alternative embodiments, part or all of RF transceiver circuitry 1372 and baseband processing circuitry 1374 may be on the same chip or set of chips, boards, or units In certain embodiments, some or all of the functionality described herein as being provided by a network node, base station, eNB or other such network device may be performed by processing circuitry 1370 executing instructions stored on device readable medium 1380 or memory within processing circuitry 1370. In alternative embodiments, some or all of the functionality may be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1370. Device readable medium 1380 may store any suitable instructions, data or information, including a computer program, software, an application including one or more of logic, rules, code, tables, etc. and/or other instructions capable of being executed by processing circuitry 1370 and, utilized by network node 1360. Device readable medium 1380 may be used to store any calculations made by processing circuitry 1370 and/or any data received via interface 1390. In some embodiments, processing circuitry 1370 and device readable medium 1380 may be considered to be integrated.

Interface 1390 is used in the wired or wireless communication of signaling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that may be coupled to, or in certain embodiments a part of, antenna 1362. Radio front end circuitry 1392 comprises filters 1398 and amplifiers 1396. Radio front end circuitry 1392 may be connected to antenna 1362 and processing circuitry 1370. Radio front end circuitry may be configured to condition signals communicated between antenna 1362 and processing circuitry 1370. Radio front end circuitry 1392 may receive digital data that is to be sent out to other network nodes or WDs via a wireless connection. Radio front end circuitry 1392 may convert the digital data into a radio signal having the appropriate channel and bandwidth parameters using a combination of filters 1398 and/or amplifiers 1396. The radio signal may then be transmitted via antenna 1362. Similarly, when receiving data, antenna 1362 may collect radio signals which are then converted into digital data by radio front end circuitry 1392. The digital data may be passed to processing circuitry 1370. In other embodiments, the interface may comprise different components and/or different combinations of components.

In certain alternative embodiments, network node 1360 may not include separate radio front end circuitry 1392, instead, processing circuitry 1370 may comprise radio front end circuitry and may be connected to antenna 1362 without separate radio front end circuitry 1392. Similarly, in some embodiments, all or some of RF transceiver circuitry 1372 may be considered a part of interface 1390. In still other embodiments, interface 1390 may include one or more ports or terminals 1394, radio front end circuitry 1392, and RF transceiver circuitry 1372, as part of a radio unit (not shown), and interface 1390 may communicate with baseband processing circuitry 1374, which is part of a digital unit (not shown).

Antenna 1362 may include one or more antennas, or antenna arrays, configured to send and/or receive wireless signals. Antenna 1362 may be coupled to radio front end circuitry 1392 and may be any type of antenna capable of transmitting and receiving data and/or signals wirelessly. In some embodiments, antenna 1362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1362 may be separate from network node 1360 and may be connectable to network node 1360 through an interface or port.

Antenna 1362, interface 1390, and/or processing circuitry 1370 may be configured to perform any receiving operations and/or certain obtaining operations described herein as being performed by a network node. Any information, data and/or signals may be received from a wireless device, another network node and/or any other network equipment. Similarly, antenna 1362, interface 1390, and/or processing circuitry 1370 may be configured to perform any transmitting operations described herein as being performed by a network node. Any information, data and/or signals may be transmitted to a wireless device, another network node and/or any other network equipment.

Power circuitry 1387 may comprise, or be coupled to, power management circuitry and is configured to supply the components of network node 1360 with power for performing the functionality described herein. Power circuitry 1387 may receive power from power source 1386. Power source 1386 and/or power circuitry 1387 may be configured to provide power to the various components of network node 1360 in a form suitable for the respective components (e.g., at a voltage and current level needed for each respective component). Power source 1386 may either be included in, or external to, power circuitry 1387 and/or network node 1360. For example, network node 1360 may be connectable to an external power source (e.g., an electricity outlet) via an input circuitry or interface such as an electrical cable, whereby the external power source supplies power to power circuitry 1387. As a further example, power source 1386 may comprise a source of power in the form of a battery or battery pack which is connected to, or integrated in, power circuitry 1387. The battery may provide backup power should the external power source fail. Other types of power sources, such as photovoltaic devices, may also be used.

Alternative embodiments of network node 1360 may include additional components beyond those shown in FIG. 13 that may be responsible for providing certain aspects of the network node's functionality, including any of the functionality described herein and/or any functionality necessary to support the subject matter described herein. For example, network node 1360 may include user interface equipment to allow input of information into network node 1360 and to allow output of information from network node 1360. This may allow a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (I) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 may include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies may be integrated into the same or different chips or set of chips as other components within WD 1310.

Antenna 1311 may include one or more antennas or antenna arrays, configured to send and/or receive wireless signals, and is connected to interface 1314. In certain alternative embodiments, antenna 1311 may be separate from WD 1310 and be connectable to WD 1310 through an interface or port. Antenna 1311, interface 1314, and/or processing circuitry 1320 may be configured to perform any receiving or transmitting operations described herein as being performed by a WD. Any information, data and/or signals may be received from a network node and/or another WD. In some embodiments, radio front end circuitry and/or antenna 1311 may be considered an interface.

As illustrated, interface 1314 comprises radio front end circuitry 1312 and antenna 1311. Radio front end circuitry 1312 comprise one or more filters 1318 and amplifiers 1316. Radio front end circuitry 1312 is connected to antenna 1311 and processing circuitry 1320, and is configured to condition signals communicated between antenna 1311 and processing circuitry 1320. Radio front end circuitry 1312 may be coupled to or a part of antenna 1311. In some embodiments, WD 1310 may not include separate radio front end circuitry 1312; rather, processing circuitry 1320 may comprise radio front end circuitry and may be connected to antenna 1311. Similarly, in some embodiments, some or all of RF transceiver circuitry 1322 may be considered a part of interface 1314. Radio front end circuitry 1312 may receive digital data that is to be sent out to other network nodes or WDs via a wireless connection. Radio front end circuitry 1312 may convert the digital data into a radio signal having the appropriate channel and bandwidth parameters using a combination of filters 1318 and/or amplifiers 1316. The radio signal may then be transmitted via antenna 1311. Similarly, when receiving data, antenna 1311 may collect radio signals which are then converted into digital data by radio front end circuitry 1312. The digital data may be passed to processing circuitry 1320. In other embodiments, the interface may comprise different components and/or different combinations of components.

Processing circuitry 1320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality may include providing any of the various wireless features or benefits discussed herein. For example, processing circuitry 1320 may execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry may comprise different components and/or different combinations of components. In certain embodiments processing circuitry 1320 of WD 1310 may comprise a SOC. In some embodiments, RF transceiver circuitry 1322, baseband processing circuitry 1324, and application processing circuitry 1326 may be on separate chips or sets of chips. In alternative embodiments, part or all of baseband processing circuitry 1324 and application processing circuitry 1326 may be combined into one chip or set of chips, and RF transceiver circuitry 1322 may be on a separate chip or set of chips. In still alternative embodiments, part or all of RF transceiver circuitry 1322 and baseband processing circuitry 1324 may be on the same chip or set of chips, and application processing circuitry 1326 may be on a separate chip or set of chips. In yet other alternative embodiments, part or all of RF transceiver circuitry 1322, baseband processing circuitry 1324, and application processing circuitry 1326 may be combined in the same chip or set of chips. In some embodiments, RF transceiver circuitry 1322 may be a part of interface 1314. RF transceiver circuitry 1322 may condition RF signals for processing circuitry 1320.

In certain embodiments, some or all of the functionality described herein as being performed by a WD may be provided by processing circuitry 1320 executing instructions stored on device readable medium 1330, which in certain embodiments may be a computer-readable storage medium. In alternative embodiments, some or all of the functionality may be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 may be configured to perform any determining, calculating, or similar operations (e.g., certain obtaining operations) described herein as being performed by a WD. These operations, as performed by processing circuitry 1320, may include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 may be operable to store a computer program, software, an application including one or more of logic, rules, code, tables, etc. and/or other instructions capable of being executed by processing circuitry 1320. Device readable medium 1330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1320. In some embodiments, processing circuitry 1320 and device readable medium 1330 may be considered to be integrated.

User interface equipment 1332 may provide components that allow for a human user to interact with WD 1310. Such interaction may be of many forms, such as visual, audial, tactile, etc. User interface equipment 1332 may be operable to produce output to the user and to allow the user to provide input to WD 1310. The type of interaction may vary depending on the type of user interface equipment 1332 installed in WD 1310. For example, if WD 1310 is a smart phone, the interaction may be via a touch screen; if WD 1310 is a smart meter, the interaction may be through a screen that provides usage (e.g., the number of gallons used) or a speaker that provides an audible alert (e.g., if smoke is detected). User interface equipment 1332 may include input interfaces, devices and circuits, and output interfaces, devices and circuits. User interface equipment 1332 is configured to allow input of information into WD 1310, and is connected to processing circuitry 1320 to allow processing circuitry 1320 to process the input information. User interface equipment 1332 may include, for example, a microphone, a proximity or other sensor, keys/buttons, a touch display, one or more cameras, a USB port, or other input circuitry. User interface equipment 1332 is also configured to allow output of information from WD 1310, and to allow processing circuitry 1320 to output information from WD 1310. User interface equipment 1332 may include, for example, a speaker, a display, vibrating circuitry, a USB port, a headphone interface, or other output circuitry. Using one or more input and output interfaces, devices, and circuits, of user interface equipment 1332, WD 1310 may communicate with end users and/or the wireless network, and allow them to benefit from the functionality described herein.

Auxiliary equipment 1334 is operable to provide more specific functionality which may not be generally performed by WDs. This may comprise specialized sensors for doing measurements for various purposes, interfaces for additional types of communication such as wired communications etc. The inclusion and type of components of auxiliary equipment 1334 may vary depending on the embodiment and/or scenario.

Power source 1336 may, in some embodiments, be in the form of a battery or battery pack. Other types of power sources, such as an external power source (e.g., an electricity outlet), photovoltaic devices or power cells, may also be used. WD 1310 may further comprise power circuitry 1337 for delivering power from power source 1336 to the various parts of WD 1310 which need power from power source 1336 to carry out any functionality described or indicated herein. Power circuitry 1337 may in certain embodiments comprise power management circuitry. Power circuitry 1337 may additionally or alternatively be operable to receive power from an external power source; in which case WD 1310 may be connectable to the external power source (such as an electricity outlet) via input circuitry or an interface such as an electrical power cable. Power circuitry 1337 may also in certain embodiments be operable to deliver power from an external power source to power source 1336. This may be, for example, for the charging of power source 1336. Power circuitry 1337 may perform any formatting, converting, or other modification to the power from power source 1336 to make the power suitable for the respective components of WD 1310 to which power is supplied.

Figure 14:
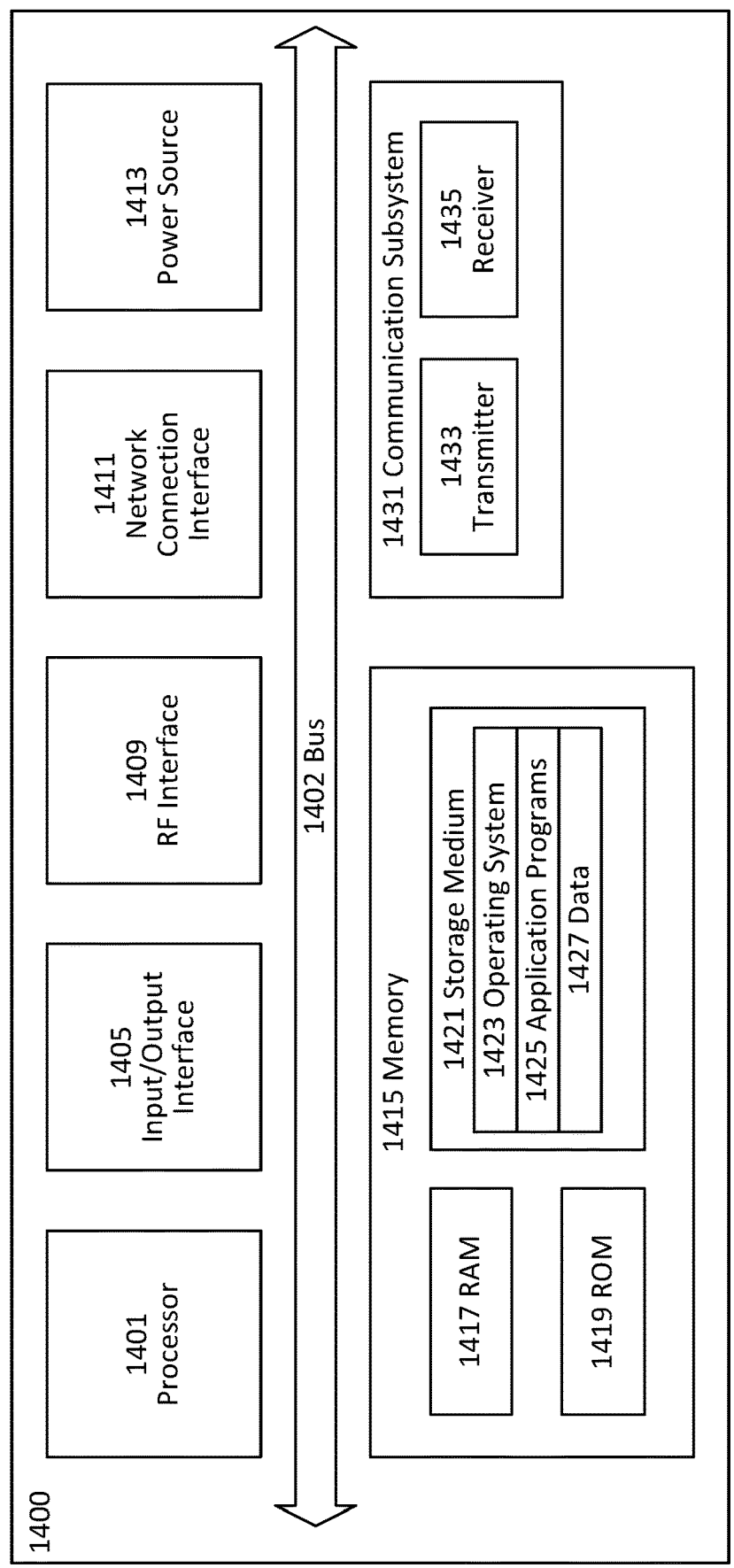
FIG. 14 is a block diagram of a user equipment in accordance with some embodiments

FIG. 14 illustrates a user Equipment in accordance with some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 14200 may be any UE identified by the 3rd Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1413, and/or any other component, or any combination thereof. Storage medium 1421 includes operating system 1423, application program 1425, and data 1427. In other embodiments, storage medium 1421 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1401 may be configured to process computer instructions and data. Processing circuitry 1401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 may include two central processing units (CPUs). Data may be information in a form suitable for use by a computer.

In the depicted embodiment, input/output interface 1405 may be configured to provide a communication interface to an input device, output device, or input and output device. UE 1400 may be configured to use an output device via input/output interface 1405. An output device may use the same type of interface port as an input device. For example, a USB port may be used to provide input to and output from UE 1400. The output device may be a speaker, a sound card, a video card, a display, a monitor, a printer, an actuator, an emitter, a smartcard, another output device, or any combination thereof. UE 1400 may be configured to use an input device via input/output interface 1405 to allow a user to capture information into UE 1400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1409 may be configured to provide a communication interface to RF components such as a transmitter, a receiver, and an antenna. Network connection interface 1411 may be configured to provide a communication interface to network 1443a. Network 1443a may encompass wired and/or wireless networks such as a local-area network (LAN), a wide-area network (WAN), a computer network, a wireless network, a telecommunications network, another like network or any combination thereof. For example, network 1443a may comprise a Wi-Fi network. Network connection interface 1411 may be configured to include a receiver and a transmitter interface used to communicate with one or more other devices over a communication network according to one or more communication protocols, such as Ethernet, TCP/IP, SONET, ATM, or the like. Network connection interface 1411 may implement receiver and transmitter functionality appropriate to the communication network links (e.g., optical, electrical, and the like). The transmitter and receiver functions may share circuit components, software or firmware, or alternatively may be implemented separately.

RAM 1417 may be configured to interface via bus 1402 to processing circuitry 1401 to provide storage or caching of data or computer instructions during the execution of software programs such as the operating system, application programs, and device drivers. ROM 1419 may be configured to provide computer instructions or data to processing circuitry 1401. For example, ROM 1419 may be configured to store invariant low-level system code or data for basic system functions such as basic input and output (I/O), startup, or reception of keystrokes from a keyboard that are stored in a non-volatile memory. Storage medium 1421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 may be configured to include operating system 1423, application program 1425 such as a web browser application, a widget or gadget engine or another application, and data file 1427. Storage medium 1421 may store, for use by UE 1400, any of a variety of various operating systems or combinations of operating systems.

Storage medium 1421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 may allow UE 1400 to access computer-executable instructions, application programs or the like, stored on transitory or non-transitory memory media, to off-load data, or to upload data. An article of manufacture, such as one utilizing a communication system may be tangibly embodied in storage medium 1421, which may comprise a device readable medium.

In FIG. 14, processing circuitry 1401 may be configured to communicate with network 1443b using communication subsystem 1431. Network 1443a and network 1443b may be the same network or networks or different network or networks. Communication subsystem 1431 may be configured to include one or more transceivers used to communicate with network 1443b. For example, communication subsystem 1431 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1433 and/or receiver 1435 to implement transmitter or receiver functionality, respectively, appropriate to the RAN links (e.g., frequency allocations and the like). Further, transmitter 1433 and receiver 1435 of each transceiver may share circuit components, software or firmware, or alternatively may be implemented separately.

In the illustrated embodiment, the communication functions of communication subsystem 1431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 may include cellular communication, Wi-Fi communication, Bluetooth communication, and GPS communication. Network 1443b may encompass wired and/or wireless networks such as a local-area network (LAN), a wide-area network (WAN), a computer network, a wireless network, a telecommunications network, another like network or any combination thereof. For example, network 1443b may be a cellular network, a Wi-Fi network, and/or a near-field network. Power source 1413 may be configured to provide alternating current (AC) or direct current (DC) power to components of UE 1400.

The features, benefits and/or functions described herein may be implemented in one of the components of UE 1400 or partitioned across multiple components of UE 1400. Further, the features, benefits, and/or functions described herein may be implemented in any combination of hardware, software or firmware. In one example, communication subsystem 1431 may be configured to include any of the components described herein. Further, processing circuitry 1401 may be configured to communicate with any of such components over bus 1402. In another example, any of such components may be represented by program instructions stored in memory that when executed by processing circuitry 1401 perform the corresponding functions described herein. In another example, the functionality of any of such components may be partitioned between processing circuitry 1401 and communication subsystem 1431. In another example, the non-computationally intensive functions of any of such components may be implemented in software or firmware and the computationally intensive functions may be implemented in hardware.

Figure 15:
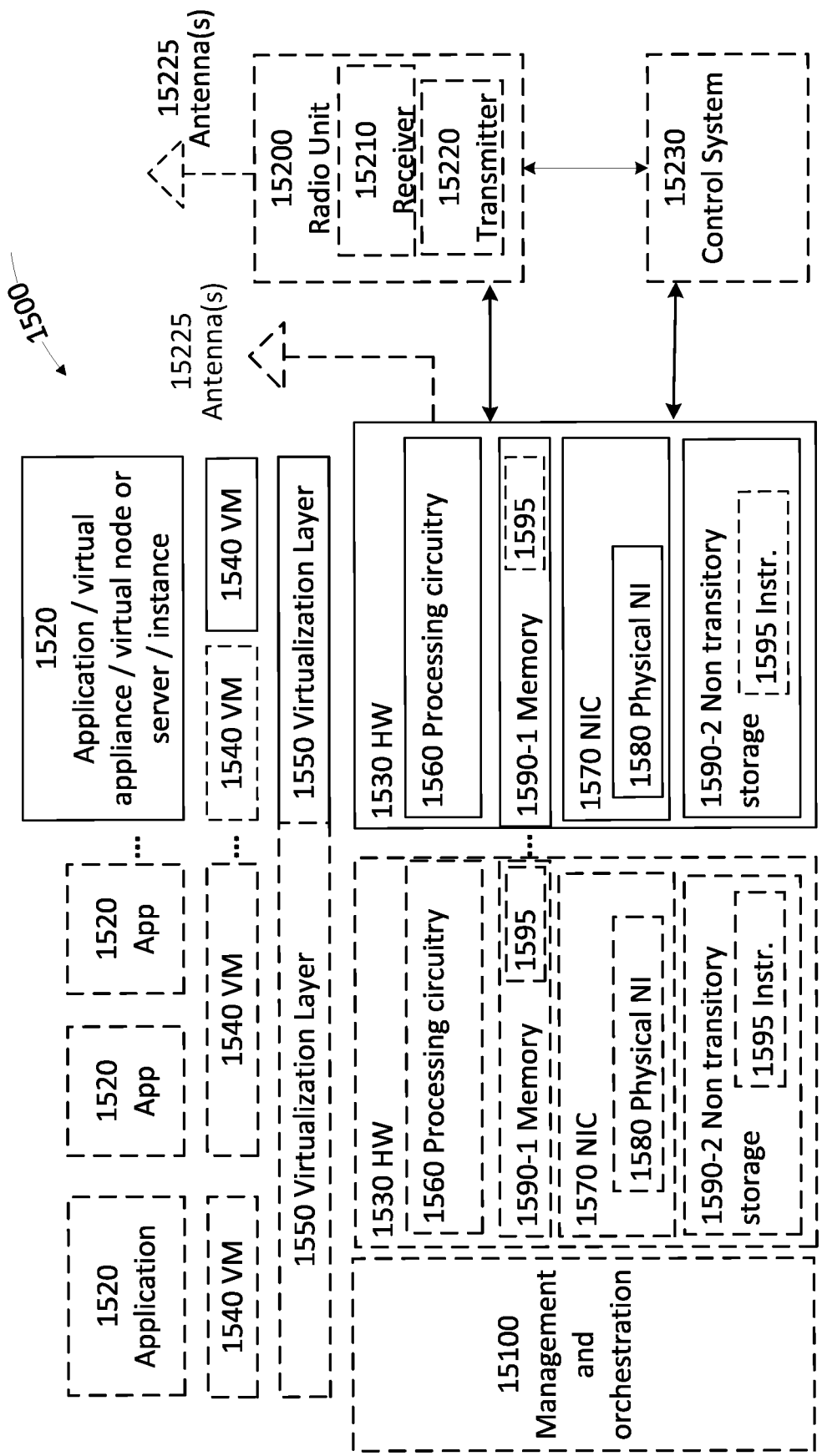
FIG. 15 is a block diagram of a virtualization environment in accordance with some embodiments.

FIG. 15 illustrates a virtualization environment in accordance with some embodiments.

FIG. 15 is a schematic block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node may be entirely virtualized.

The functions may be implemented by one or more applications 1520 (which may alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which may be commercial off-the-shelf (COTS) processors, dedicated Application Specific Integrated Circuits (ASICs), or any other type of processing circuitry including digital or analog hardware components or special purpose processors. Each hardware device may comprise memory 1590-1 which may be non-persistent memory for temporarily storing instructions 1595 or software executed by processing circuitry 1560. Each hardware device may comprise one or more network interface controllers (NICs) 1570, also known as network interface cards, which include physical network interface 1580. Each hardware device may also include non-transitory, persistent, machine-readable storage media 1590-2 having stored therein software 1595 and/or instructions executable by processing circuitry 1560. Software 1595 may include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540 comprise virtual processing, virtual memory, virtual networking or interface and virtual storage, and may be run by a corresponding virtualization layer 1550 or hypervisor. Different embodiments of the instance of virtual appliance 1520 may be implemented on one or more of virtual machines 1540, and the implementations may be made in different ways.

During operation, processing circuitry 1560 executes software 1595 to instantiate the hypervisor or virtualization layer 1550, which may sometimes be referred to as a virtual machine monitor (VMM). Virtualization layer 1550 may present a virtual operating platform that appears like networking hardware to virtual machine 1540.

As shown in FIG. 15, hardware 1530 may be a standalone network node with generic or specific components. Hardware 1530 may comprise antenna 15225 and may implement some functions via virtualization. Alternatively, hardware 1530 may be part of a larger cluster of hardware (e.g. such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1540 may be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 may be coupled to one or more antennas 15225. Radio units 15200 may communicate directly with hardware nodes 1530 via one or more appropriate network interfaces and may be used in combination with the virtual components to provide a virtual node with radio capabilities, such as a radio access node or a base station.

In some embodiments, some signaling can be effected with the use of control system 15230 which may alternatively be used for communication between the hardware nodes 1530 and radio units 15200.

Figure 16:
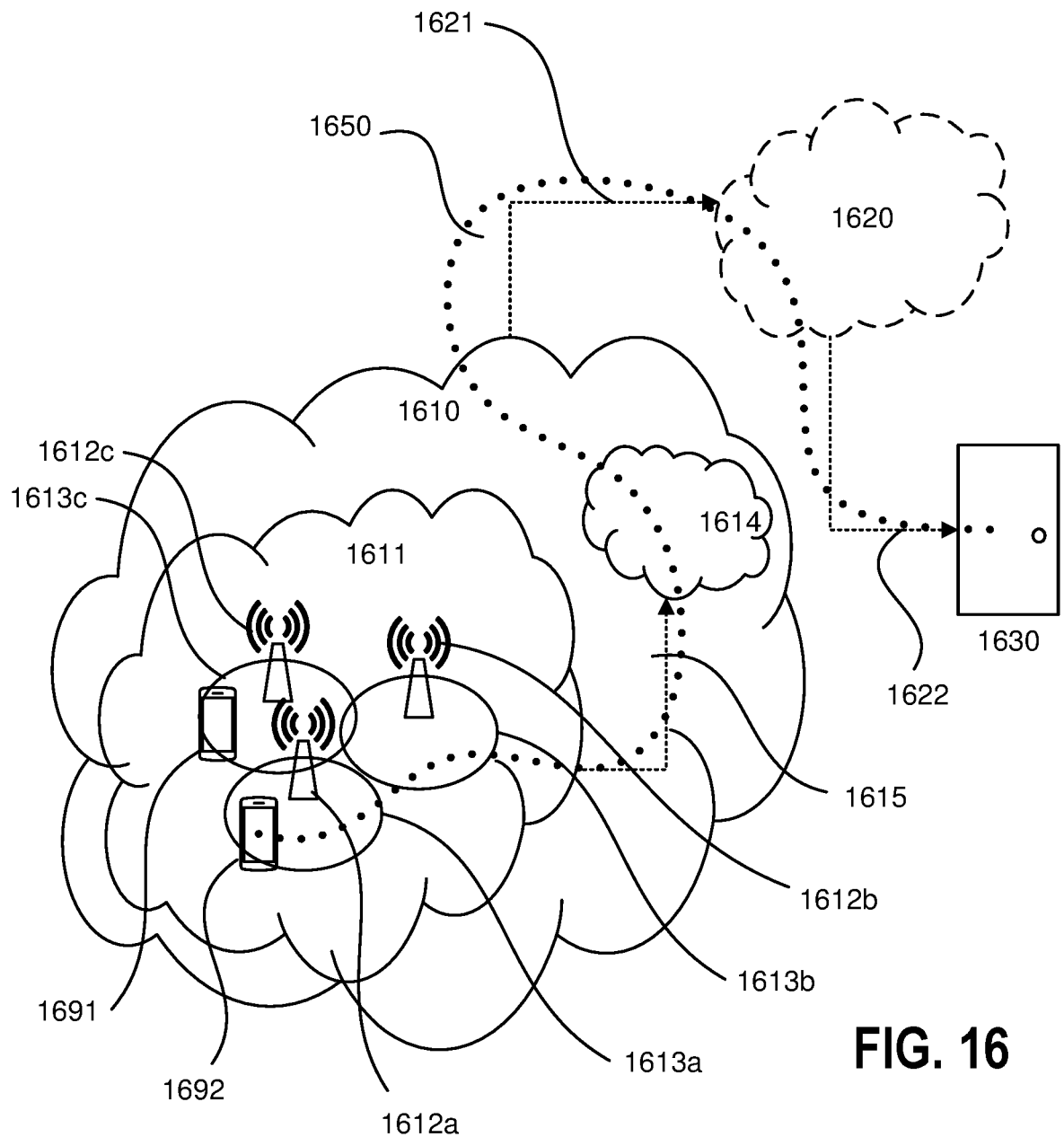
FIG. 16 is a block diagram of a telecommunication network connected via an intermediate network to a host computer in accordance with some embodiments.

FIG. 16 illustrates a telecommunication network connected via an intermediate network to a host computer in accordance with some embodiments.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c is configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612.

Telecommunication network 1610 is itself connected to host computer 1630, which may be embodied in the hardware and/or software of a standalone server, a cloud-implemented server, a distributed server or as processing resources in a server farm. Host computer 1630 may be under the ownership or control of a service provider, or may be operated by the service provider or on behalf of the service provider. Connections 1621 and 1622 between telecommunication network 1610 and host computer 1630 may extend directly from core network 1614 to host computer 1630 or may go via an optional intermediate network 1620. Intermediate network 1620 may be one of, or a combination of more than one of, a public, private or hosted network; intermediate network 1620, if any, may be a backbone network or the Internet; in particular, intermediate network 1620 may comprise two or more sub-networks (not shown).

The communication system of FIG. 16 as a whole enables connectivity between the connected UEs 1691, 1692 and host computer 1630. The connectivity may be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 may be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Figure 17:
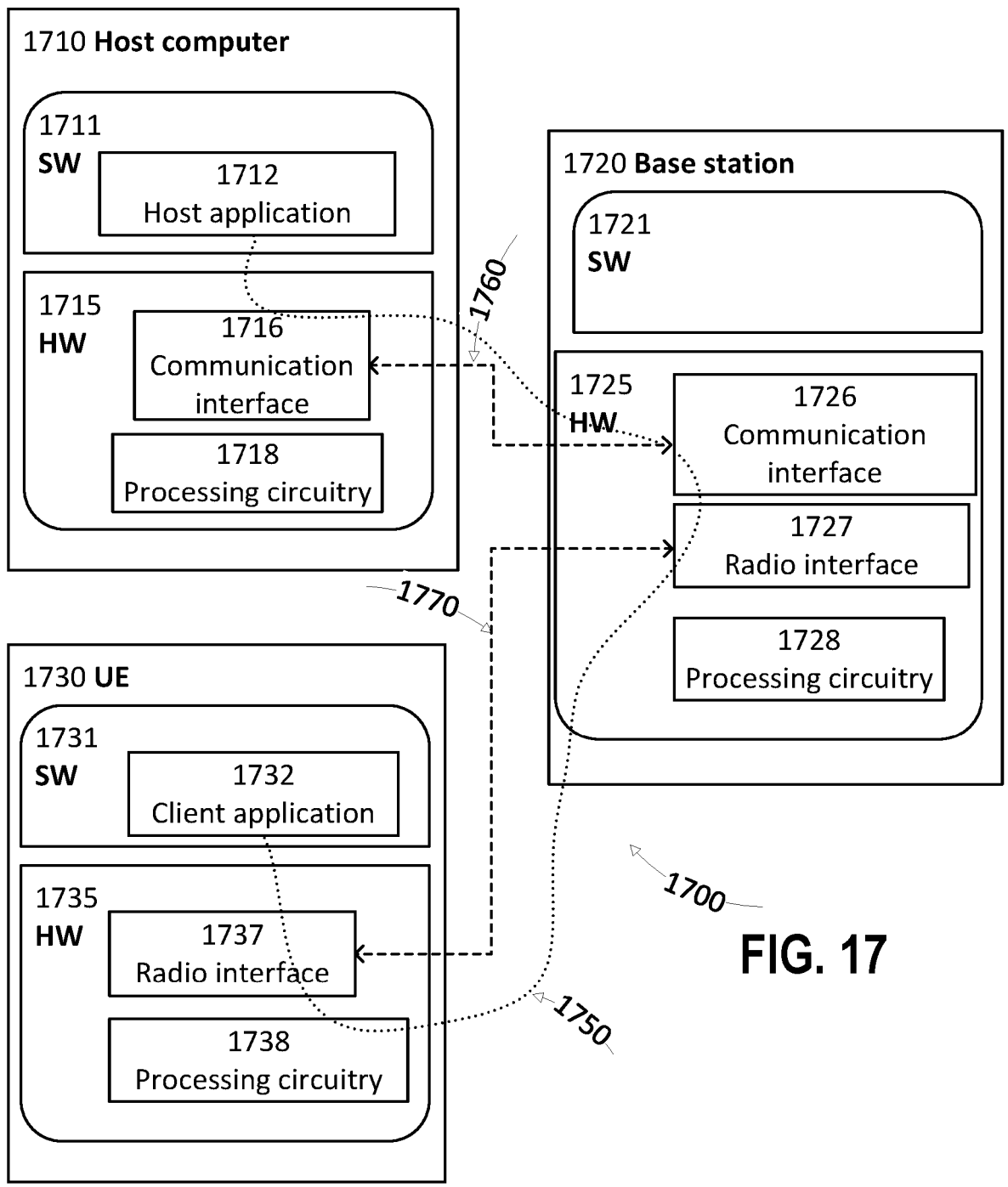
FIG. 17 is a block diagram of a host computer communicating via a base station with a user equipment over a partially wireless connection in accordance with some embodiments.

FIG. 17 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which may have storage and/or processing capabilities. In particular, processing circuitry 1718 may comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 may be operable to provide a service to a remote user, such as UE 1730 connecting via OTT connection 1750 terminating at UE 1730 and host computer 1710. In providing the service to the remote user, host application 1712 may provide user data which is transmitted using OTT connection 1750.

Communication system 1700 further includes base station 1720 provided in a telecommunication system and comprising hardware 1725 enabling it to communicate with host computer 1710 and with UE 1730. Hardware 1725 may include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 may be configured to facilitate connection 1760 to host computer 1710. Connection 1760 may be direct or it may pass through a core network (not shown in FIG. 17) of the telecommunication system and/or through one or more intermediate networks outside the telecommunication system. In the embodiment shown, hardware 1725 of base station 1720 further includes processing circuitry 1728, which may comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 further includes UE 1730 already referred to. It's hardware 1735 may include radio interface 1737 configured to set up and maintain wireless connection 1770 with a base station serving a coverage area in which UE 1730 is currently located. Hardware 1735 of UE 1730 further includes processing circuitry 1738, which may comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 may be operable to provide a service to a human or non-human user via UE 1730, with the support of host computer 1710. In host computer 1710, an executing host application 1712 may communicate with the executing client application 1732 via OTT connection 1750 terminating at UE 1730 and host computer 1710. In providing the service to the user, client application 1732 may receive request data from host application 1712 and provide user data in response to the request data. OTT connection 1750 may transfer both the request data and the user data. Client application 1732 may interact with the user to generate the user data that it provides.

It is noted that host computer 1710, base station 1720 and UE 1730 illustrated in FIG. 17 may be similar or identical to host computer 1630, one of base stations 1612a, 1612b, 1612c and one of UEs 1691, 1692 of FIG. 16, respectively. This is to say, the inner workings of these entities may be as shown in FIG. 17 and independently, the surrounding network topology may be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure may determine the routing, which it may be configured to hide from UE 1730 or from the service provider operating host computer 1710, or both. While OTT connection 1750 is active, the network infrastructure may further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments may improve the performance of OTT services provided to UE 1730 using OTT connection 1750, in which wireless connection 1770 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 1750 between host computer 1710 and UE 1730, in response to variations in the measurement results. The measurement procedure and/or the network functionality for reconfiguring OTT connection 1750 may be implemented in software 1711 and hardware 1715 of host computer 1710 or in software 1731 and hardware 1735 of UE 1730, or both. In embodiments, sensors (not shown) may be deployed in or in association with communication devices through which OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of OTT connection 1750 may include message format, retransmission settings, preferred routing etc.; the reconfiguring need not affect base station 1720, and it may be unknown or imperceptible to base station 1720. Such procedures and functionalities may be known and practiced in the art. In certain embodiments, measurements may involve proprietary UE signaling facilitating host computer 1710's measurements of throughput, propagation times, latency and the like. The measurements may be implemented in that software 1711 and 1731 causes messages to be transmitted, in particular empty or 'dummy' messages, using OTT connection 1750 while it monitors propagation times, errors etc.

Figure 18:
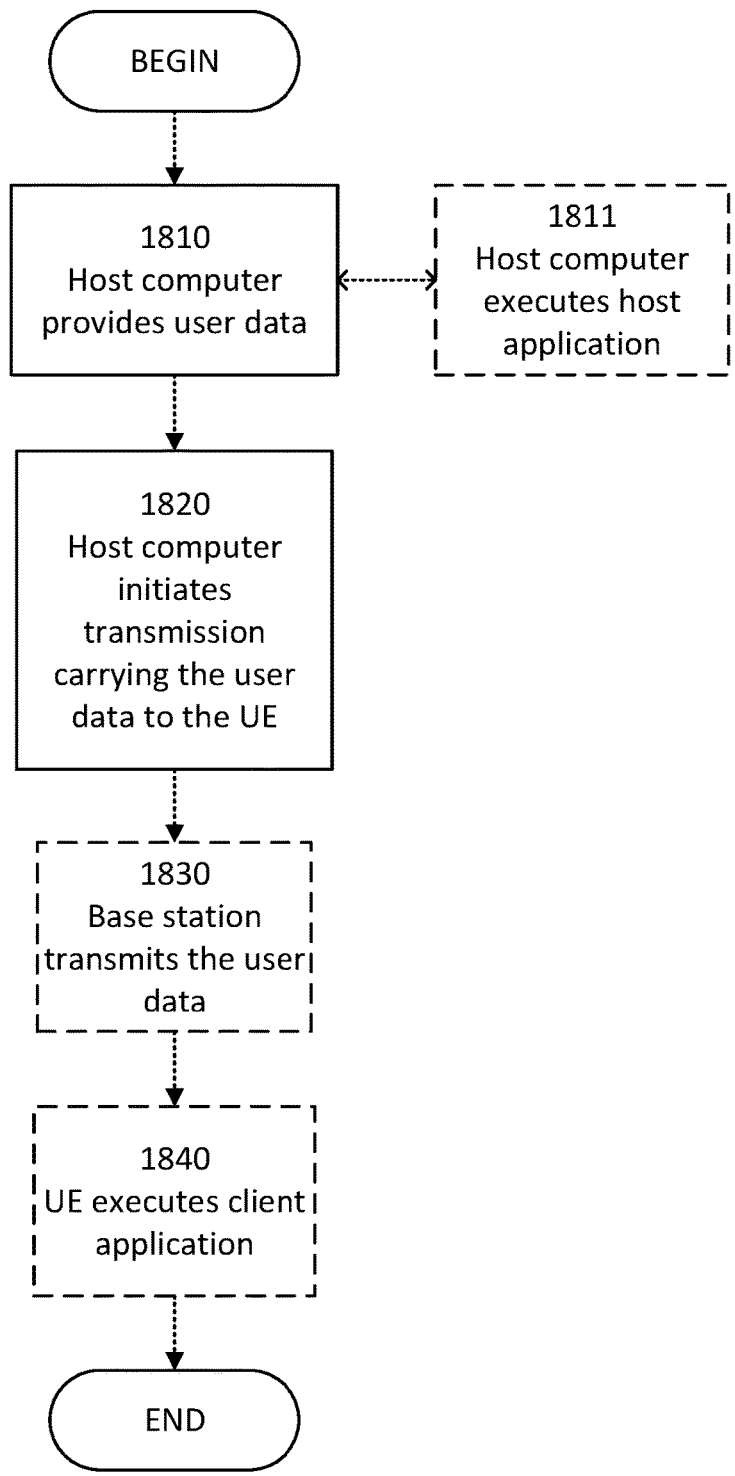
FIG. 18 is a block diagram of methods implemented in a communication system including a host computer, a base station and a user equipment in accordance with some embodiments.

FIG. 18 illustrates methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 16-17. For simplicity of the present disclosure, only drawing references to FIG. 18 will be included in this section. In step 1810, the host computer provides user data. In sub step 1811 (which may be optional) of step 1810, the host computer provides the user data by executing a host application. In step 1820, the host computer initiates a transmission carrying the user data to the UE. In step 1830 (which may be optional), the base station transmits to the UE the user data which was carried in the transmission that the host computer initiated, in accordance with the teachings of the embodiments described throughout this disclosure. In step 1840 (which may also be optional), the UE executes a client application associated with the host application executed by the host computer.

Figure 19:
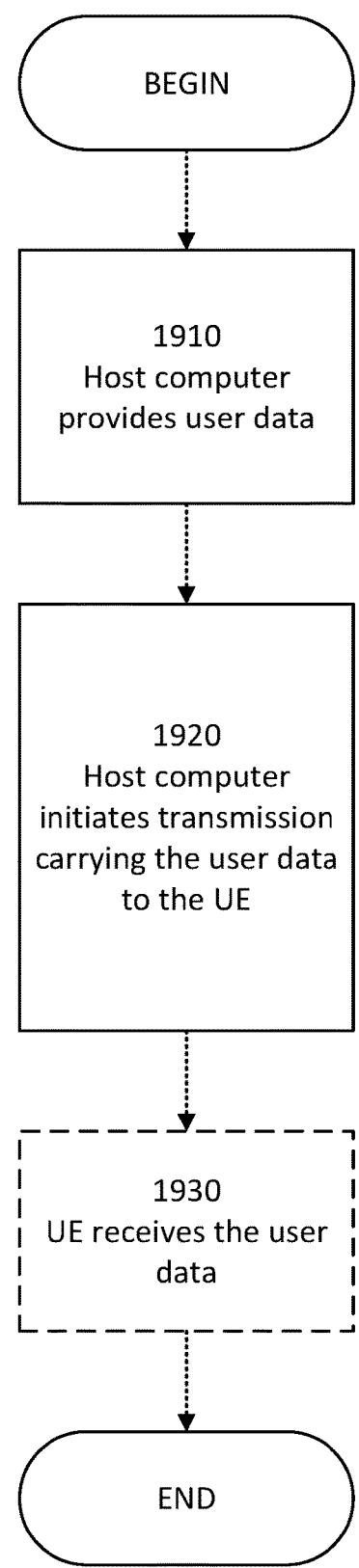
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 16-17. For simplicity of the present disclosure, only drawing references to FIG. 19 will be included in this section. In step 1910 of the method, the host computer provides user data. In an optional sub step (not shown) the host computer provides the user data by executing a host application. In step 1920, the host computer initiates a transmission carrying the user data to the UE. The transmission may pass via the base station, in accordance with the teachings of the embodiments described throughout this disclosure. In step 1930 (which may be optional), the UE receives the user data carried in the transmission.

FIG. 20 illustrates methods implemented in a communication system including a host computer, a base station and a user equipment in accordance with some embodiments FIG. 20 is a flowchart illustrating a method implemented in a communication system, in accordance with one embodiment. The communication system includes a host computer, a base station and a UE which may be those described with reference to FIGS. 16-17. For simplicity of the present disclosure, only drawing references to FIG. 20 will be included in this section. In step 2010 (which may be optional), the UE receives input data provided by the host computer. Additionally or alternatively, in step 2020, the UE provides user data. In sub step 2021 (which may be optional) of step 2020, the UE provides the user data by executing a client application. In sub step 2011 (which may be optional) of step 2010, the UE executes a client application which provides the user data in reaction to the received input data provided by the host computer. In providing the user data, the executed client application may further consider user input received from the user. Regardless of the specific manner in which the user data was provided, the UE initiates, in sub step 2030 (which may be optional), transmission of the user data to the host computer. In step 2040 of the method, the host computer receives the user data transmitted from the UE, in accordance with the teachings of the embodiments described throughout this disclosure.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 16-17. For simplicity of the present disclosure, only drawing references to FIG. 21 will be included in this section. In step 2110 (which may be optional), in accordance with the teachings of the embodiments described throughout this disclosure, the base station receives user data from the UE. In step 2120 (which may be optional), the base station initiates transmission of the received user data to the host computer. In step 2130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method, performed by a user equipment ("UE"), of handling registrations of the UE in different wireless communication networks, the method comprising:
obtaining information indicating whether a Universal Subscriber Identity Module ("USIM") of the UE supports storing multiple different Non-Access Stratum ("NAS") security contexts of the UE associated with the different wireless communication networks, each NAS security context of the different NAS security contexts include a third generation partnership project ("3GPP") Access NAS Security Context and a non-3GPP Access NAS Security Context of the UE for a wireless communication network of the different wireless communication networks; and
determining whether the USIM supports storing the multiple different NAS security contexts of the UE associated with the different wireless communication networks based on the information.

2. The method of claim 1, wherein the different wireless communication networks comprises:
a first Public Land Mobile Network ("PLMN"); and
a second PLMN different from the first PLMN.

3. The method of claim 1, wherein obtaining the information comprises determining whether a certain service is available in a Elementary File USIM Service Table ("EF UST") of the USIM, the certain service including one of a new service or an updated definition of an existing service previously defined in the EF_UST.

4. The method of claim 1, wherein obtaining the information comprises determining whether multiple Elementary Files ("EFs") are available in the USIM for the different wireless communication networks.

5. The method of claim 1, wherein obtaining the information comprises determining whether the USIM is configured to store multiple EFs with indications that each EF of the multiple EFs are associated with a respective wireless communication network of the different wireless communication networks.

6. The method of claim 1, wherein obtaining the information comprises determining whether multiple fields for NAS COUNTs are available in the USIM for the different wireless communication networks.

7. The method of claim 1, wherein obtaining the information comprises determining whether the USIM is configured to store multiple NAS COUNTs for each wireless communication network of the different wireless communication networks.

8. The method of claim 1, wherein obtaining the information comprises determining whether a field in the USIM indicates which NAS security context of the different NAS security contexts belongs to which wireless communication network of the different wireless communication networks.

9. The method of claim 1, wherein obtaining the information comprises determining whether a size of EFs associated with the different wireless communication networks indicates that different NAS security contexts associated with the different wireless communication networks are supported.

10. The method of claim 1, wherein obtaining the information comprises determining whether multiple records are one of supported or present in EFs associated with the different wireless communication networks.

11. The method of claim 1, wherein determining whether the USIM supports storing the multiple different NAS security contexts of the UE comprises determining the USIM supports storing the multiple different NAS security contexts of the UE associated with the different wireless communication networks based on the obtained information.

12. The method of claim 1, further comprising:
storing the multiple different NAS security contexts to the USIM.

13. The method of claim 12, wherein storing the multiple different NAS security contexts to the USIM comprises storing the multiple different NAS security contexts to the USIM in one of multiple EFs or multiple records in EFs associated with each wireless communication network of the different wireless communication networks.

14. The method of claim 12, wherein storing the multiple different NAS security contexts to the USIM in one of multiple EFs or multiple records in EFs associated with each wireless communication network of the different wireless communication networks comprises:
storing a first set of NAS COUNT pairs of a first NAS security context of the multiple NAS security contexts in the USIM, the first NAS security context is associated with a first wireless communication network of the different wireless networks; and
storing a second set of NAS COUNT pairs of a second NAS security context of the multiple NAS security contexts in the USIM, the second NAS security context is associated with a second wireless communication network of the different wireless networks.

15. The method of claim 14, wherein the first set of NAS COUNT pairs is associated with a 3GPP access and non-3GPP access of the first wireless communication network, and
wherein the second set of NAS COUNT pairs is associated with a 3GPP access and non-3GPP access of the second wireless communication network.

16. The method of claim 1, wherein determining whether the USIM supports storing the multiple different NAS security contexts of the UE associated with the different wireless communication networks comprises determining the USIM does not support storing the multiple different NAS security contexts of the UE associated with the different wireless communication networks.

17. The method of claim 1, further comprising:
storing a NAS security context of the multiple different NAS security contexts of the UE in a non-volatile memory of the UE.

18. The method of claim 17, wherein storing the NAS security context of the multiple different NAS security contexts of the UE in the non-volatile memory of the UE comprises:
storing a first NAS security context of the multiple different NAS security contexts of the UE on the USIM, the first NAS security context is associated with a first communication network of the different wireless communication networks, and
storing a second NAS security context of the multiple different NAS security contexts of the UE in the non-volatile memory, the second NAS security context is associated with a second communication network of the different wireless communication networks.

19. The method of claim 18, wherein storing the first NAS security context comprises storing a first set of NAS COUNT pairs of the first NAS security context in the USIM, and wherein storing the second NAS security context comprises storing a second set of NAS COUNT pairs of a second NAS security context in the non-volatile memory.

20. The method of claim 18, wherein the first set of NAS COUNT pairs is associated with a 3GPP access and non-3GPP access of the first wireless communication network, and wherein the second set of NAS COUNT pairs is associated with a 3GPP access and non-3GPP access of the second wireless communication network.

21. The method of claim 1, further comprising:

storing the multiple different NAS security contexts of the UE in a non-volatile memory of the UE instead of the USIM of the UE.

22. The method of claim 21, wherein storing the multiple different NAS security contexts of the UE associated with the different wireless communication networks in the non-volatile memory of the UE instead of the USIM of the UE comprises:

storing a first NAS security context of the multiple different NAS security contexts of the UE in the non-volatile memory, the first NAS security context associated with a first communication network of the different wireless communication networks, and storing a second NAS security context of the multiple different NAS security contexts of the UE in the non-volatile memory, the second NAS security context associated with a second communication network of the different wireless communication networks.

23. The method of claim 22, wherein the first NAS security context comprises a first set of NAS COUNT pairs associated with the first wireless communication network and a second set of NAS COUNT pairs associated with the second wireless communication network.

24. The method of claim 22, wherein the first set of NAS COUNT pairs is associated with a 3GPP access and non-3GPP access of the first wireless communication network, and wherein the second set of NAS COUNT pairs is associated with a 3GPP access and non-3GPP access of the second wireless communication network.

25. The method of claim 1, further comprising:

storing, in the non-volatile memory, an indication that the first wireless communication network is associated with the first NAS security context stored in the USIM and that the second wireless communication network is associated with the second NAS security context stored in the non-volatile memory.

26. The method of claim 1, further comprising:

using one of the first NAS security context and the second NAS security context; or using both the first NAS security context and the second NAS security context.

27. A User Equipment ("UE") configured to handle registrations in different wireless communication networks, comprising:

processing circuitry; and memory coupled to the processing circuitry and having instructions stored therein that are executable by the processing circuitry to cause the UE to perform operations comprising:

obtaining information indicating whether a Universal Subscriber Identity Module ("USIM") of the UE supports storing multiple different Non-Access Stratum ("NAS") security contexts of the UE associated with the different wireless communication networks, each NAS security context of the different NAS security contexts include a third generation partnership project ("3GPP") Access NAS Security Context and a non-3GPP Access NAS Security Context of the UE for a wireless communication network of the different wireless communication networks; and determining whether the USIM supports storing the multiple different NAS security contexts of the UE associated with the different wireless communication networks based on the information.

28. The UE of claim 27, wherein the different wireless communication networks comprise:

a first Public Land Mobile Network ("PLMN"); and a second PLMN different from the first PLMN.

29. The UE of claim 27, wherein obtaining the information comprises determining whether a certain service is available in a Elementary File USIM Service Table ("EF UST") of the USIM, the certain service including one of a new service or an updated definition of an existing service previously defined in the EF_UST.

30. The UE of claim 27, wherein obtaining the information comprises determining whether multiple fields for NAS COUNTs are available in the USIM for the different wireless communication networks.

* * * * *